(12) United States Patent
Kurata et al.

(10) Patent No.: US 11,934,247 B2
(45) Date of Patent: Mar. 19, 2024

(54) INFORMATION PROCESSING APPARATUS AND INFORMATION PROCESSING METHOD

(71) Applicant: SONY CORPORATION, Tokyo (JP)

(72) Inventors: Masatomo Kurata, Tokyo (JP); Takashi Nitta, Tokyo (JP); Futoshi Takeuchi, Tokyo (JP); Kenji Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 538 days.

(21) Appl. No.: 17/250,188

(22) PCT Filed: Jun. 6, 2019

(86) PCT No.: PCT/JP2019/022473
§ 371 (c)(1),
(2) Date: Dec. 11, 2020

(87) PCT Pub. No.: WO2019/244648
PCT Pub. Date: Dec. 26, 2019

(65) Prior Publication Data
US 2021/0255688 A1 Aug. 19, 2021

(30) Foreign Application Priority Data
Jun. 19, 2018 (JP) ................................. 2018-115802

(51) Int. Cl.
*G06F 1/32* (2019.01)
*G06F 1/3209* (2019.01)
(Continued)

(52) U.S. Cl.
CPC .......... *G06F 1/3212* (2013.01); *G06F 1/3209* (2013.01); *G06F 1/329* (2013.01); *G06F 21/31* (2013.01); *G06F 1/3203* (2013.01)

(58) Field of Classification Search
CPC ...... G06F 1/3212; G06F 1/3209; G06F 1/329; G06F 21/31; G06F 21/335; H04M 1/00;
(Continued)

(56) References Cited

U.S. PATENT DOCUMENTS 8,224,894 B1 * 7/2012 Parks .................... H04L 69/329
709/250
9,641,508 B2 * 5/2017 Sonoda ............... H04L 67/5682
(Continued)

FOREIGN PATENT DOCUMENTS

CN 104702794 A 6/2015
JP 2008-017279 A 1/2008
(Continued)

OTHER PUBLICATIONS

International Search Report and Written Opinion of PCT Application No. PCT/JP2019/022473, dated Sep. 3, 2019, 07 pages of ISRWO.

(Continued)

*Primary Examiner* — Volvick Derose
(74) *Attorney, Agent, or Firm* — CHIP LAW GROUP

(57) ABSTRACT

An information processing apparatus includes a communication unit capable of communicating with a server, a battery, and a controller. The controller is capable of executing processing regarding a predetermined function for which personal authentication is required at a time of use, detects a remaining charge level of the battery, and transmits, when the detected remaining charge level is less than a predetermined threshold value, a transfer request signal to the server, the transfer request signal requesting transfer of use authority of the function to another information processing apparatus.

11 Claims, 16 Drawing Sheets

(51) Int. Cl.
*G06F 1/3212* (2019.01)
*G06F 1/329* (2019.01)
*G06F 21/31* (2013.01)
*G06F 1/3203* (2019.01)

(58) Field of Classification Search
CPC .... H04M 11/00; H04L 12/417; H04L 63/083; H04L 63/10; H04L 67/04
USPC ......................................................... 713/320
See application file for complete search history.

(56) References Cited

U.S. PATENT DOCUMENTS

| | | | | |
|---|---|---|---|---|
| 11,470,247 | B2* | 10/2022 | Miyatani | H04N 23/00 |
| 11,680,655 | B1* | 6/2023 | Fatehi | F16K 17/363 |
| | | | | 700/282 |
| 2003/0078894 | A1* | 4/2003 | Kon | H04L 63/0869 |
| | | | | 705/64 |
| 2008/0008201 | A1* | 1/2008 | Imahase | H04W 40/24 |
| | | | | 370/401 |
| 2010/0218007 | A1* | 8/2010 | Oshima | G06F 1/3215 |
| | | | | 726/16 |
| 2014/0380429 | A1* | 12/2014 | Matsugashita | H04L 63/0884 |
| | | | | 726/4 |
| 2015/0261279 | A1* | 9/2015 | Das | G06F 1/3212 |
| | | | | 713/320 |
| 2017/0136908 | A1* | 5/2017 | Ricci | B60L 53/32 |
| 2017/0249003 | A1* | 8/2017 | Nonogaki | G06F 1/325 |
| 2017/0286028 | A1* | 10/2017 | Yang | G06F 3/1285 |
| 2019/0124433 | A1* | 4/2019 | Jo | H04R 1/1025 |
| 2022/0321357 | A1* | 10/2022 | Omori | H04L 9/3236 |

FOREIGN PATENT DOCUMENTS

| | | |
|---|---|---|
| JP | 2015-005202 A | 1/2015 |
| JP | 2016-051451 A | 4/2016 |
| JP | 2017-130064 A | 7/2017 |
| JP | 2018-074236 A | 5/2018 |

OTHER PUBLICATIONS

Office Action dated Apr. 2, 2022 in Chinese Appln No. 201980038402.1.

* cited by examiner

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2019/022473 filed on Jun. 6, 2019, which claims priority benefit of Japanese Patent Application No. JP 2018-115802 filed in the Japan Patent Office on Jun. 19, 2018. Each of the above-referenced applications is hereby incorporated herein by reference in its entirety.

TECHNICAL FIELD

The present technology relates to an information processing apparatus, an information processing method, and a program that are capable of transferring the use authority of a function to another information processing apparatus.

BACKGROUND ART

In the past, there has been a technique that enables the use of functions (applications) between multiple devices. For example, Patent Literature 1 discloses that use of a plurality of applications is migrated between devices through wireless communication, specifically, when it is determined by a proximity sensor or the like that a second client device is located near a first client device, a copy of an e-mail received by the e-mail application of the first client device is received by the e-mail application of the second client device to send a reply.

CITATION LIST

Patent Literature

Patent Literature 1: U.S. Pat. No. 8,224,894

DISCLOSURE OF INVENTION

Technical Problem

However, according to the technique described in Patent Literature 1, even if the user wants to transfer the use of the application from the first client device to the second client device, the transfer to the second client device becomes impossible when the battery of the first client device runs out.

In view of the circumstances as described above, it is an object of the present technology to provide an information processing apparatus, an information processing method, and a program that are capable of transferring the use authority of a function to another information processing apparatus before the remaining battery level becomes zero.

Solution to Problem

In order to achieve the object described above, an information processing apparatus according to an embodiment of the present technology includes a communication unit capable of communicating with a server, a battery, and a controller. The controller is capable of executing processing regarding a predetermined function for which personal authentication is required at a time of use, detects a remaining charge level of the battery, and transmits, when the detected remaining charge level is less than a predetermined threshold value, a transfer request signal to the server, the transfer request signal requesting transfer of use authority of the function to another information processing apparatus.

This configuration allows the information processing apparatus to transfer the use authority of the function to another information processing apparatus before the remaining battery level becomes zero. Here, the threshold value is, for example, 10% or 5%, but is not limited thereto.

The information processing apparatus may further include an output unit. In this case, the controller may output, from the output unit, information for recommending the transfer of the use authority to the other information processing apparatus when the remaining charge level is less than the threshold value, and may receive a user operation for transmitting the transfer request signal via the output unit.

Thus, the information processing apparatus allows the user to grasp the necessity of the transfer of the usage authority and is capable of easily executing the transfer processing according to a user operation. Here, the output unit may be a display or a speaker, the information for recommendation may be character/image information or sound information, and the user operation may be a touch operation or a voice operation.

The controller may request, when receiving the user operation, an input of information of personal authentication required for use of the function.

Thus, the information processing apparatus is capable of performing the authority transfer processing simply and effectively by performing both the operation for requesting the transfer of the use authority of the function and the authentication processing therefor.

The controller may transmit information regarding means and a level of the personal authentication in response to a request from the server. In this case, the server may set a level of personal authentication in the other information processing apparatus to a level corresponding to the level of the personal authentication in the information processing apparatus if the means for the personal authentication differs between the information processing apparatus and the other information processing apparatus.

Thus, if the other information processing apparatuses of the authority transfer destination does not have the same authentication means (e.g., biometric authentication) as that of the transfer source, the server is capable of setting a level equal to the level of the above authentication means for another authentication means (e.g., multi-digit password), thus maintaining the authentication accuracy of the transfer destination.

The information processing apparatus may further include a short-range communication unit capable of short-range communication with the other information processing apparatus. In this case, the controller may transmit additional information necessary for the transfer of the use authority to the other information processing apparatus by the short-range communication unit. Further, in this case, when the server receives the transfer request signal via the communication unit, the server may delete a first token indicating the use authority of the information processing apparatus and transmit a second token indicating the usage authority of the other information processing apparatus to the other information processing apparatus via a network.

Thus, the information processing apparatus transmits the additional information to the other information processing apparatus by the short-range communication unit, thereby making it possible to transfer the usage authority even when the additional information is not stored in advance in the other information processing apparatus (even when the other information processing apparatus is owned by another person or is a rented one). The short-range communication unit is, for example, a communication unit using near field communication (NFC), ultrasonic waves, infrared rays, or the like.

The controller may transmit authentication information necessary for personal authentication in the other information processing apparatus by the short-range communication unit if means for the personal authentication differs between the information processing apparatus and the other information processing apparatus.

Thus, the information processing apparatus is capable of transmitting the authentication information on the spot and transferring the authority if the other information processing apparatuses does not have the same authentication means as that of the transfer source and the authentication information (password or the like) necessary for the authentication in the other information processing apparatus is not registered in advance.

The controller may transmit, to the server, a first transfer request signal requesting transfer of use authority of a first function among a plurality of the functions when the detected remaining charge level is less than a first threshold value. Further, the controller may transmit, to the server, a second transfer request signal requesting transfer of use authority of a second function among the plurality of the functions when the detected remaining charge level is less than a second threshold value lower than the first threshold value.

Thus, the information processing apparatus is capable of delegating a plurality of functions in a stepwise manner in accordance with the importance or the like thereof. For example, in a case where the importance of the plurality of functions is different (for example, the importance of the payment service is higher than that of the message service) and the other information processing apparatus is owned by another user, from the viewpoint of security, the controller may transfer first a function having a lower importance and refrain from transferring a function having a higher importance as much as possible. Conversely, in order to perform the function more reliably in the other information processing apparatus having a sufficient remaining charge level, the controller may transfer first a function having a higher importance.

The controller may transmit, when the detected remaining charge level is less than a first threshold value, the transfer request signal to the server. Further, the controller may transmit, when the detected remaining charge level is less than a second threshold value lower than the first threshold value, remaining level lowering information to the server, the remaining level lowering information indicating that the remaining charge level is lowered.

The server may transmit, when receiving the transfer request signal, a second token that is not activated and indicates the use authority of the other information processing apparatus to the other information processing apparatus in a state where the first token indicating the use authority of the information processing apparatus is activated. Further, the server may deactivate the first token and activate the second token when receiving the remaining level lowering information.

Thus, the information processing apparatus causes the other information processing apparatus to hold the token information when the remaining charge level is lowered to some extent, and activates the token when the remaining charge level is further lowered and is about to run out, thereby making it possible to reliably perform the transfer while leaving the function as much as possible in the transfer source apparatus.

The controller may transmit a recovery request signal requesting recovery of the use authority to the server, when the detected remaining charge level becomes equal to or larger than the threshold value after being less than the threshold value.

Thus, the information processing apparatus is capable of recovering the use authority when the remaining level becomes equal to or larger than the threshold value by charging.

The controller may detect a radio wave intensity received by the communication unit, and transmit the transfer request signal when the detected remaining charge level is less than the threshold value and when the detected radio wave intensity is less than a predetermined threshold value.

Thus, the information processing apparatus is capable of determining the transfer of the authority in consideration of not only the remaining battery level but also the communication radio wave status.

An information processing method according to another embodiment of the present technology includes: detecting a remaining charge level of a battery of an information processing apparatus capable of executing processing regarding a predetermined function for which personal authentication is required at a time of use; and transmitting, when the detected remaining charge level is less than a predetermined threshold value, a transfer request signal to a server, the transfer request signal requesting transfer of use authority of the function from the information processing apparatus to another information processing apparatus.

A program according to still another embodiment of the present technology causes an information processing apparatus, which is capable of executing processing regarding a predetermined function for which personal authentication is required at a time of use, to execute the steps of: detecting a remaining charge level of a battery of the information processing apparatus; and transmitting, when the detected remaining charge level is less than a predetermined threshold value, a transfer request signal to a server, the transfer request signal requesting transfer of use authority of the function from the information processing apparatus to another information processing apparatus.

Advantageous Effects of Invention

As described above, according to the present technology, it is possible to transfer the use authority of a function to another information processing apparatus before the remaining battery level becomes zero. However, the present technology is not limited to this effect.

MODE(S) FOR CARRYING OUT THE INVENTION

Embodiments according to the present technology will be described below with reference to the drawings.

First Embodiment

First, a first embodiment of the present technology will be described.

[Overview of System]

Figure 1:
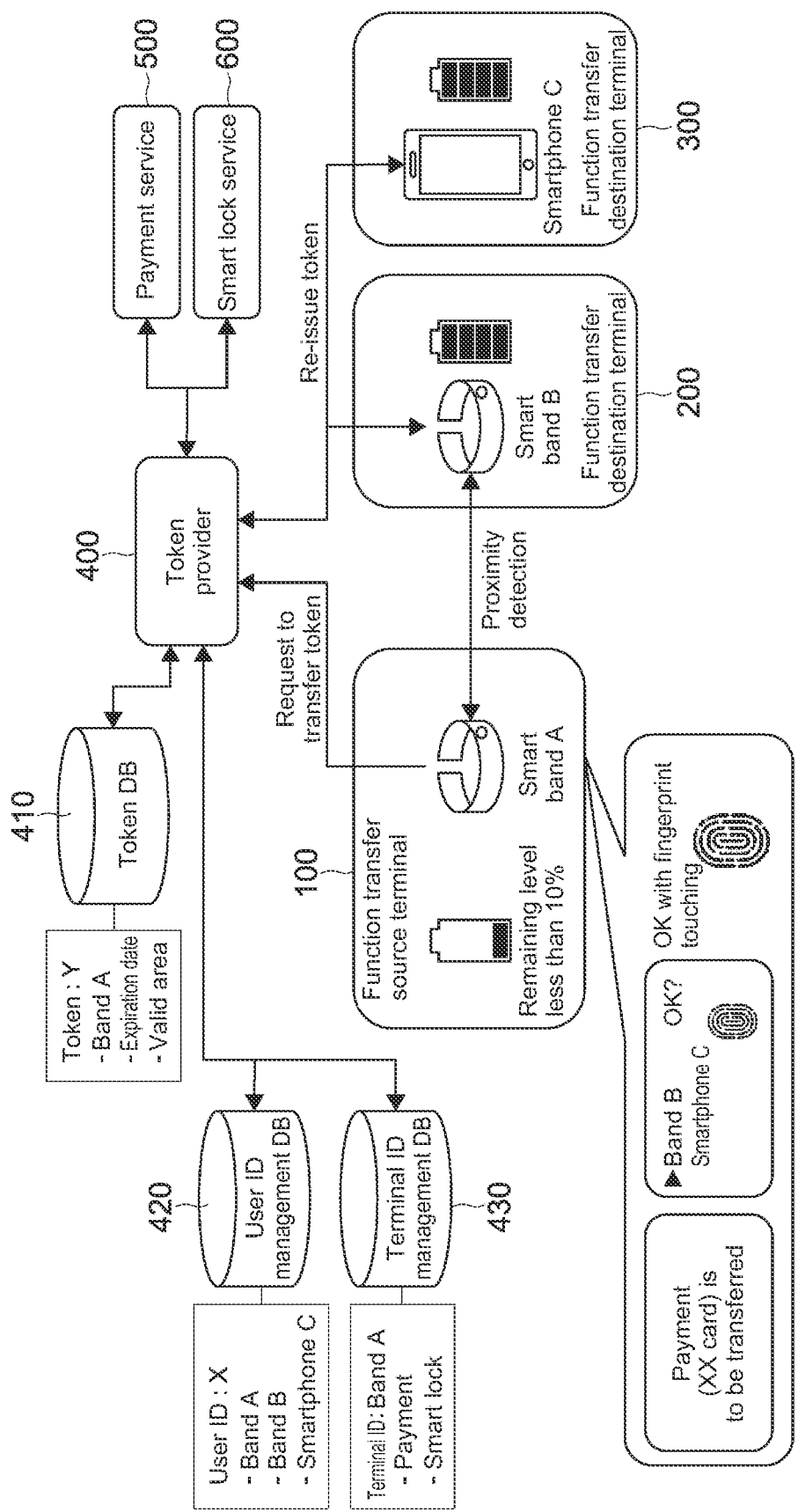
FIG. 1 is a diagram showing a configuration of a function transfer system according to a first embodiment of the present technology.

FIG. 1 is a diagram showing a configuration of a function transfer system according to a first embodiment of the present technology.

As shown in the figure, the system includes a transfer source terminal 100, transfer destination terminals 200 and 300, a token provider 400, a payment service provider 500, and a smart lock service provider 600. The transfer source terminal 100 and the transfer destination terminals 200 and 300 are communicable with the token provider 400, the payment service provider 500, and the smart lock service provider 600 via a network such as the Internet.

The transfer source terminal 100 is a terminal capable of transferring the use authority of functions of the terminal (information processing apparatus) to another terminal and is, for example, a smart band in this embodiment. The functions include applications installed on the terminal such as a messenger, and various services using a network such as a payment service and a smart lock service.

The transfer destination terminals 200 and 300 are terminals (information processing apparatuses) capable of receiving, from the transfer source terminal 100, the transfer of the use authority of the functions of the terminal, and in this embodiment, the transfer destination terminal 200 is a smart band, and the transfer destination terminal 300 is a smartphone.

The token provider 400 is a provider (server computer) that issues (gives) a token necessary for transferring the functions described above. Here, the token is obtained by replacing a user ID, a payment card number, and the like necessary for executing the above functions with a unique ID associated with an expiration date and restricted information so as to be handled by a specific terminal.

The token provider 400 is capable of accessing databases of a token database (DB) 410, a user ID management database (DB) 420, and a terminal ID management database (DB) 430. Each of those databases may be stored within the token provider 400 or may be stored externally.

The token DB 410 stores the token in association with information such as the terminal ID of each of the transfer source terminal 100 and the transfer destination terminals 200 and 300 that request the transfer/issuance of the token, the user ID of a user of each terminal, the payment card number, an expiration date, and a valid service area.

The user ID management DB 420 stores the user ID in association with a terminal ID group (the terminal IDs of the transfer source terminal 100 and the transfer destination terminals 200 and 300) of one or more terminals owned by the user corresponding to the user ID.

The terminal ID management DB 430 stores the terminal IDs of the transfer source terminal 100 and the transfer destination terminals 200 and 300 in association with the functions (services) of those terminals.

The payment service provider 500 is a provider (server computer) that executes processing for providing the payment service to each terminal.

The smart lock service provider 600 is a provider (server computer) that performs processing for providing the smart lock service to each terminal.

In this embodiment, the transfer source terminal 100 is capable of transferring the use authority of the functions (payment service and smart lock service) of the transfer source terminal 100 to the transfer destination terminals 200 and 300 in accordance with the remaining battery level of the transfer source terminal 100. The token provider 400 manages such transfer processing, receives a function transfer request from the transfer source terminal 100, and issues a token indicating the use authority of the functions to the transfer destination terminals 200 and 300 in response to the function transfer request, thus achieving the transfer processing.

[Hardware Configuration of Transfer Source Terminal]

Figure 2:
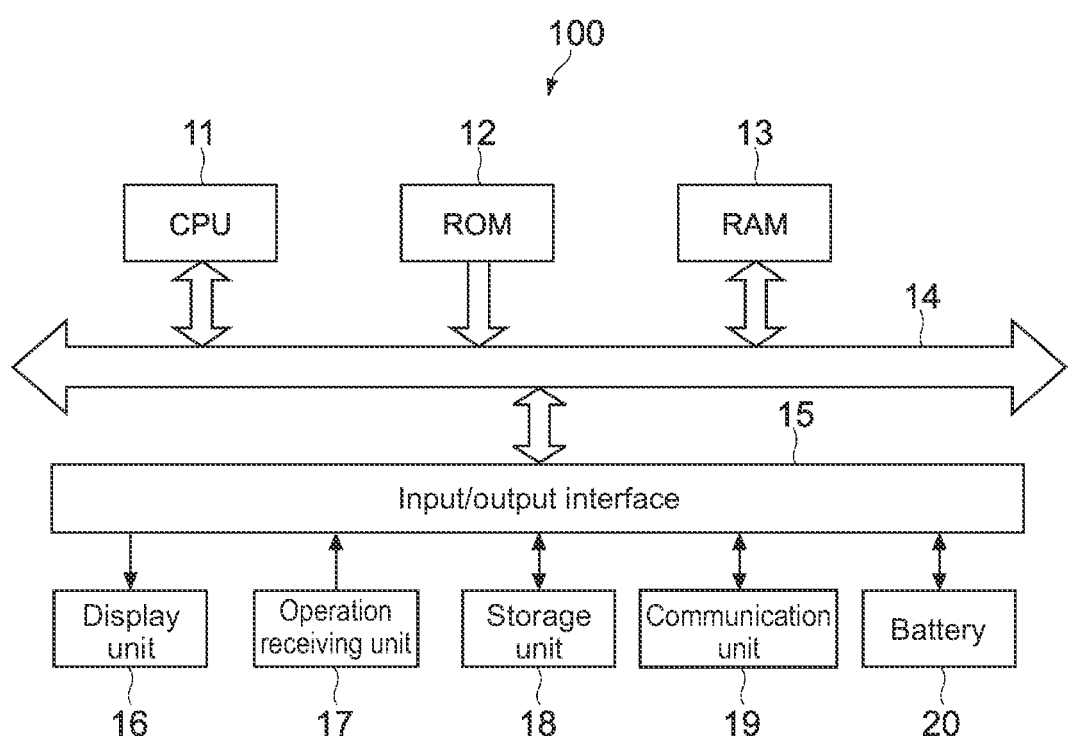
FIG. 2 is a diagram showing a hardware configuration of a smart band of the function transfer system.

FIG. 2 is a diagram showing a hardware configuration of the transfer source terminal 100. As shown in the figure, the transfer source terminal 100 (smart band) includes a central processing unit (CPU) 11, a read only memory (ROM) 12, a random access memory (RAM) 13, an input/output interface 15, and a bus 14 that connects those components to one another.

The CPU 11 appropriately accesses the RAM 13 or the like as needed and comprehensively controls the whole of the blocks of the smart band 100 while performing various types of arithmetic processing. The ROM 12 is a non-volatile memory in which firmware such as various parameters, a program, or an operating system (OS) to be executed by the CPU 11 is fixedly stored. The RAM 13 is used as a work area or the like of the CPU 11 and temporarily stores the OS, various applications being executed, and various types of data being processed.

A display unit 16, an operation receiving unit 17, a storage unit 18, a communication unit 19, a battery 20, and the like are connected to the input/output interface 15.

The display unit 16 is a display device using, for example, a liquid crystal display (LCD), an organic electroluminescence display (OELD), or the like.

The operation receiving unit 17 is, for example, a touch panel, buttons, or other input devices. In a case where the operation receiving unit 17 is a touch panel, the touch panel may be integrated with the display unit 16.

The storage unit 18 is a non-volatile memory such as a hard disk drive (HDD), a flash memory (solid state drive (SSD)), or another solid-state memory. The OS, various applications, and various types of data described above are stored in the storage unit 18. In particular, in this embodiment, the storage unit 18 stores programs and data such as an application for executing processing of transferring functions to the transfer destination terminals 200 and 300 (hereinafter, referred to as a transfer application), in addition to applications such as a messenger application, a payment application, and a smart lock application that achieve the functions described above.

In the transfer application, a list of applications such as the above-mentioned messenger and payment application installed in the transfer source terminal 100 is registered. As will be described later in detail, as shown in the lower part of FIG. 1, when the remaining charge level of the battery 20 of the transfer source terminal 100 is less than a predetermined value (for example, 10%), an interface for allowing the user to select an application to be transferred and a transfer destination terminal is displayed on the display unit 16 by the transfer application.

The communication unit 19 is, for example, a network interface card (NIC) for Ethernet, various modules for wireless communication such as a wireless LAN, or other communication interfaces, and is responsible for communication processing between the 3D display device 110, a gesture input/recognition device 120, and a camera 200. That is, the communication unit 19 functions as an output unit that outputs a three-dimensional object generated by the CPU 11 to the 3D display device 110 and causes the 3D display device 110 to display the three-dimensional object.

The battery 20 supplies power to each unit of the transfer source terminal 100. The CPU 11 and the transfer application detect the remaining charge level of the battery 20 for the transfer processing.

Although not shown in the figure, the basic hardware configuration of the transfer destination terminals 200 and 300 (smart band, smartphone) and the basic hardware configuration of the token provider 400 (server computer) are also substantially similar to that of the transfer source terminal 100.

[Functional Block Configuration of Function Transfer System]

Figure 3:
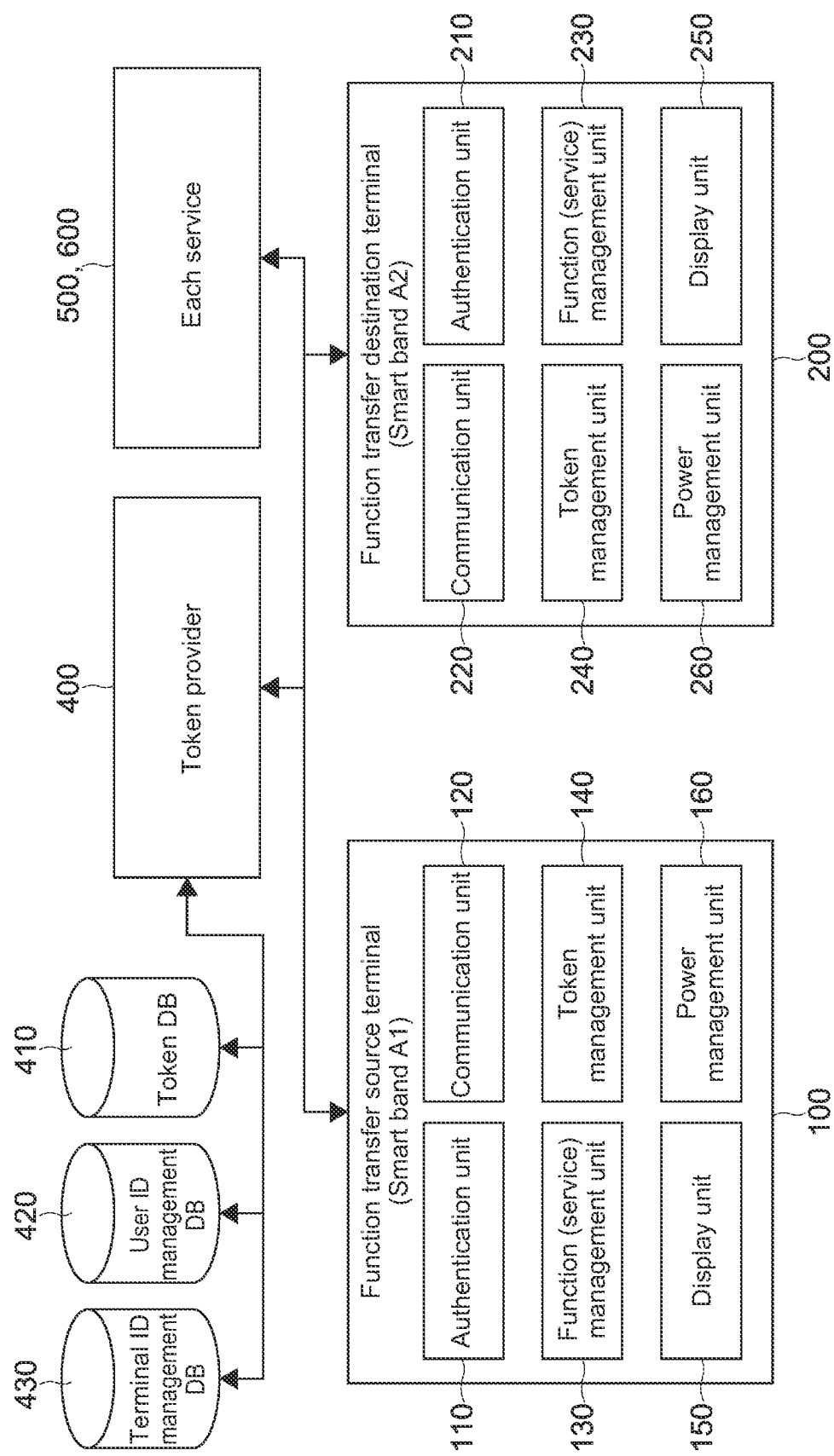
FIG. 3 is a diagram showing a functional block of the function transfer system.

FIG. 3 is a diagram showing functional block configurations of the transfer source terminal 100 and the transfer destination terminal 200.

As shown in the figure, the transfer source terminal 100 includes an authentication unit 110, a communication unit 120, a function management unit 130, a token management unit 140, a display unit 150, and a power management unit 160 as functional blocks (software modules).

The authentication unit 110 authenticates the use authority of each of the above-mentioned functions by an authentication technique such as fingerprint authentication, vein authentication, or face authentication. The authentication unit 110 stores in advance authentication information (fingerprint pattern information or the like) of the user of the transfer source terminal 100.

The communication unit 120 is an interface for wireless local area network (LAN) communication such as Wi-Fi, for example, and communicates with the token provider 400.

The function management unit 130 manages information regarding the types of various functions (applications, services) of the transfer source terminal 100, such as messenger, payment, and smart lock.

The token management unit 130 securely manages a token given by the token provider 400 and indicating the use authority of each function managed by the function management unit 130. The token management unit 130 includes a secure element having a type enforcement (TE) function, for example.

The display unit 150 displays image information and character information, such as an interface for transfer processing by the transfer application, on the display unit 16.

The power management unit 160 monitors the remaining charge level of the battery 20.

Further, similarly to the transfer source terminal 100, the transfer destination terminal 200 includes an authentication unit 210, a communication unit 220, a function management unit 230, a token management unit 240, a display unit 250, and a power management unit 260 as functional blocks (software modules). The functions of those units are similar to those of the corresponding units of the transfer source terminal 100.

[Operation of Function Transfer System]

Next, the operation of the function transfer system configured as described above will be described. The operation is executed in cooperation with hardware such as the CPU and the communication unit of the transfer source terminal 100 or the token provider 400 and software such as the transfer application stored in the storage unit. In the following description, for convenience, the CPU or the functional block will be described mainly as an operation subject.

Figure 4:
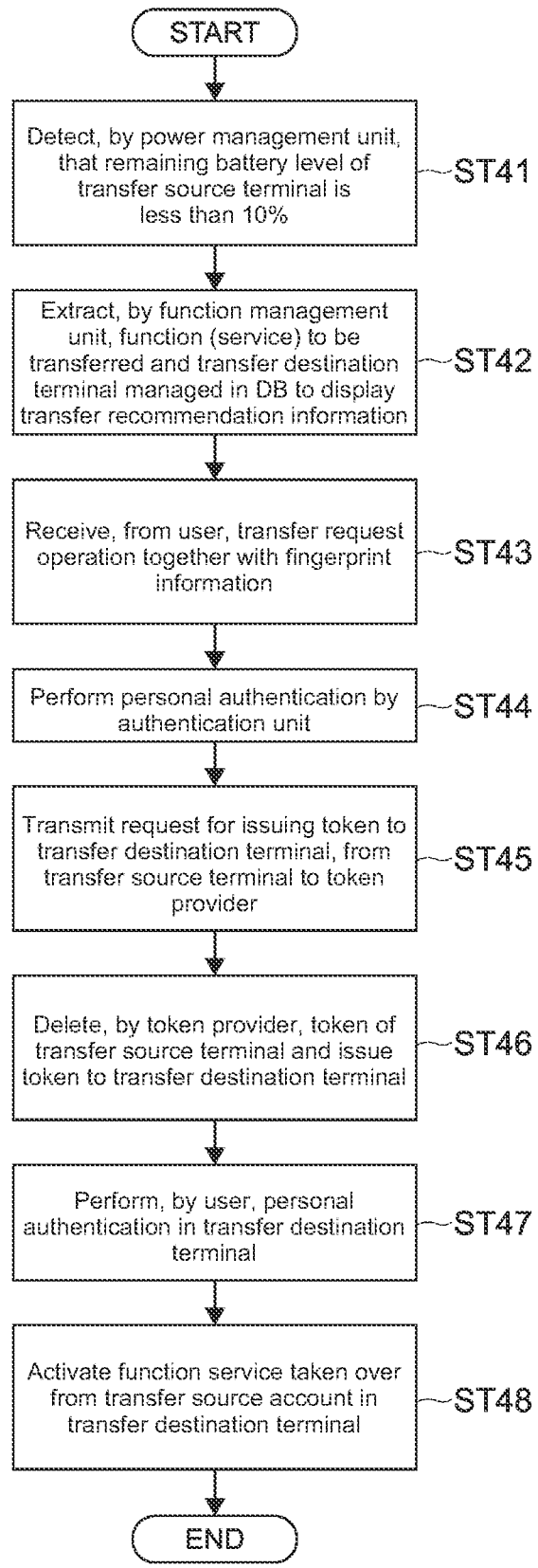
FIG. 4 is a flowchart showing the flow of the operation of the function transfer system.

FIG. 4 is a flowchart showing the flow of the operation of the function transfer system.

First, the CPU 11 (power management unit 160) of the transfer source terminal 100 detects that the remaining charge level of the battery 20 is less than a predetermined threshold value (e.g., 10%) (Step 41).

The CPU 11 (function management unit 130) then selects a function (service) to be transferred among the functions (services) of the transfer source terminal 100 on the basis of previous setting, for example, acquires a list of transfer destination terminals managed in association with the transfer source terminal 100 from the terminal ID management DB 430, generates transfer recommendation information that recommends the transfer of the function, and causes the display unit 16 to display the transfer recommendation information (Step 42).

The transfer recommendation information includes, for example, as shown in FIG. 1, a list of transfer destination terminals and functions to be transferred among the functions of the transfer source terminal 100. In addition, in a case where an authentication method performed by the authentication unit 110 is fingerprint authentication, the transfer recommendation information may include an image (e.g., an image of a fingerprint) that prompts the user to provide a fingerprint by touching and indicates a position to be touched.

The CPU 11 may allow the user to select a function to be transferred from a plurality of functions, instead of the previous setting as described above. Further, the CPU 11 may preset, for example, a default terminal for the transfer destination terminal, and if there is a plurality of candidate transfer destination terminals, may place the selection pointer on the terminal preset in the transfer recommendation information.

Subsequently, the CPU 11 (function management unit 130) receives, from the user, through the display unit 16, an operation for an agreement to transfer the displayed function and for a selection of the transfer destination terminal (Step 43). This operation can be referred to as a request operation for transferring the use authority of the function. Further, the selection is received by touching with the user's fingertip, so that the CPU 11 also receives the input of fingerprint information for authenticating the user at the same time as the selection. Here, it is assumed that the payment service is selected by the CPU 11 as the function to be transferred, and the transfer destination terminal 200 is selected by the user as the transfer destination terminal.

Subsequently, the CPU 11 (authentication unit 110) executes the personal authentication processing on the basis of the input fingerprint information and the fingerprint pattern information stored in advance (Step 44).

If the user is authenticated by the authentication processing, the CPU 11 transmits a request signal for issuing a token to the selected transfer destination terminal 200 (transfer request signal) to the token provider 400 by the communication unit 120 (Step 45).

The token provider 400 that has received the transfer request signal deletes the token from the token management unit 140 of the transfer source terminal 100 and transmits the token to the transfer destination terminal 200 (Step 46).

When receiving the token from the token provider 400, the CPU (token management unit 240) of the transfer destination terminal 200 displays an authentication screen on the display unit to prompt the user to input, for example, the fingerprint pattern, and the authentication unit 210 authenticates that user on the basis of the input fingerprint pattern (Step 47).

If the authentication succeeds, the token management unit 240 sets the received token to valid (Step 48). This enables the transfer destination terminal 200 to use the function (service) taken over from the transfer source terminal 100.

As described above, according to this embodiment, the transfer source terminal 100 is capable of transferring the use authority of functions to the transfer destination terminal before the remaining charge level of the battery 20 becomes zero. At that time, the transfer source terminal 100 displays the transfer recommendation information when the remaining charge level is less than a predetermined value, and thus allows the user to grasp the necessity of transfer of the use authority and to easily execute the transfer processing in accordance with the user operation. In addition, the transfer source terminal 100 is capable of performing the authority transfer processing simply and effectively by combining the operation input for transferring the function and the input of the authentication information for the transfer on the display screen of the transfer recommendation information.

Second Embodiment

Next, a second embodiment of the present technology will be described. In this embodiment, portions having functions and configurations similar to those of the first embodiment are denoted by the same reference numerals, and overlapping descriptions are omitted or simplified.

Figure 5:
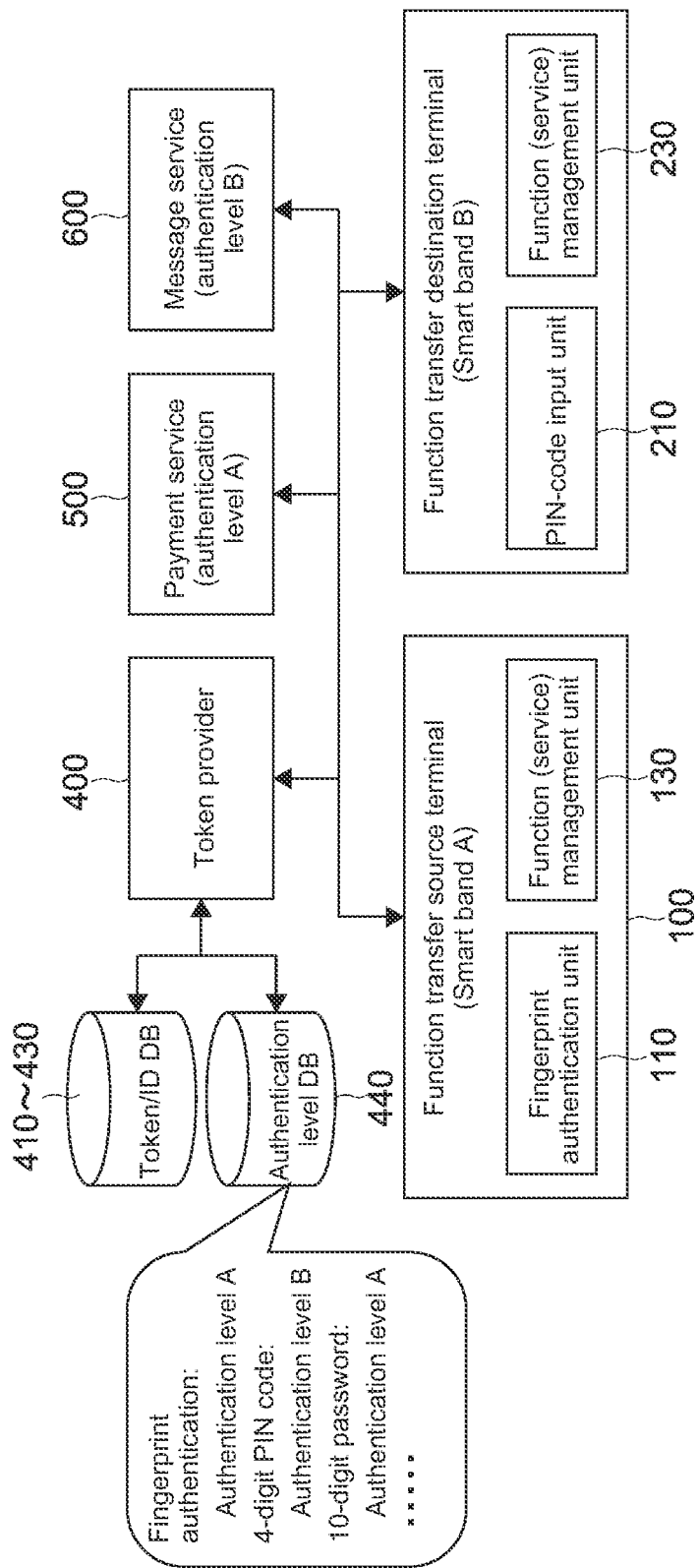
FIG. 5 is a diagram showing a configuration of a function transfer system according to a second embodiment of the present technology.

FIG. 5 is a diagram showing a configuration of a function transfer system according to this embodiment.

In the embodiment described above, it is assumed that the transfer source terminal 100 and the transfer destination terminal 200 include the same authentication means (authentication unit 110 and authentication unit 210). However, some terminals do not include biometric authentication means for fingerprint authentication, vein authentication, and the like and are only compatible with authentication means using passwords and passcodes.

In this regard, in this embodiment, the token provider 400 sets the personal authentication level of the transfer function in the transfer destination terminal to an appropriate level in accordance with the personal authentication level of the function of the transfer source terminal 100.

As shown in the figure, in this embodiment, the token provider 400 includes an authentication level DB 440 in addition to the databases shown in FIGS. 1 and 3.

The authentication level DB 440 stores information indicating authentication levels corresponding to different authentication means such as fingerprint authentication, PIN code authentication, and password authentication. On the basis of such information, the token provider 400 sets the authentication level in the authentication means of the transfer destination terminal 200 in accordance with the authentication level of the authentication means of the transfer source terminal 100.

For example, in a case where the transfer source terminal 100 has the fingerprint authentication means but the transfer destination terminal 200 does not have the fingerprint authentication means, and in a case where the false acceptance rate (FAR) of the fingerprint authentication means is $10^{-5}$ (e.g., payment service), the token provider 400 sets the password authentication of the transfer destination terminal 200 to request a 10-digit password corresponding to the FAR.

Further, in a case where the FAR of the fingerprint authentication means is $10^{-4}$ (e.g., login of the message service) lower than the above, the token provider 400 sets the password authentication of the transfer destination terminal 200 to request a 4-digit PIN code corresponding to the FAR.

The transfer source terminal 100 transmits, in response to a request from the token provider 400, information (such as FAR) regarding the personal authentication level of the fingerprint authentication means for the purpose of processing of setting the personal authentication level by the token provider 400. The token provider 400 transmits information regarding the authentication level set in accordance with the information from the transfer source terminal 100 to the transfer destination terminal 200 at the time of issuing the token, for example, and causes the authentication unit 210 of the transfer destination terminal 200 to set the authentication level.

As described above, according to this embodiment, in a case where the transfer source terminal and the transfer destination terminal do not include the same authentication means (e.g., biometric authentication), the token provider 400 is capable of setting the level equal to the authentication means for another authentication means (e.g., a multi-digit password) and thus maintaining authentication accuracy at the transfer destination.

Third Embodiment

Next, a third embodiment of the present technology will be described. In this embodiment, portions having functions and configurations similar to those of the above embodiments are denoted by the same reference numerals, and overlapping descriptions are omitted or simplified.

Figure 6:
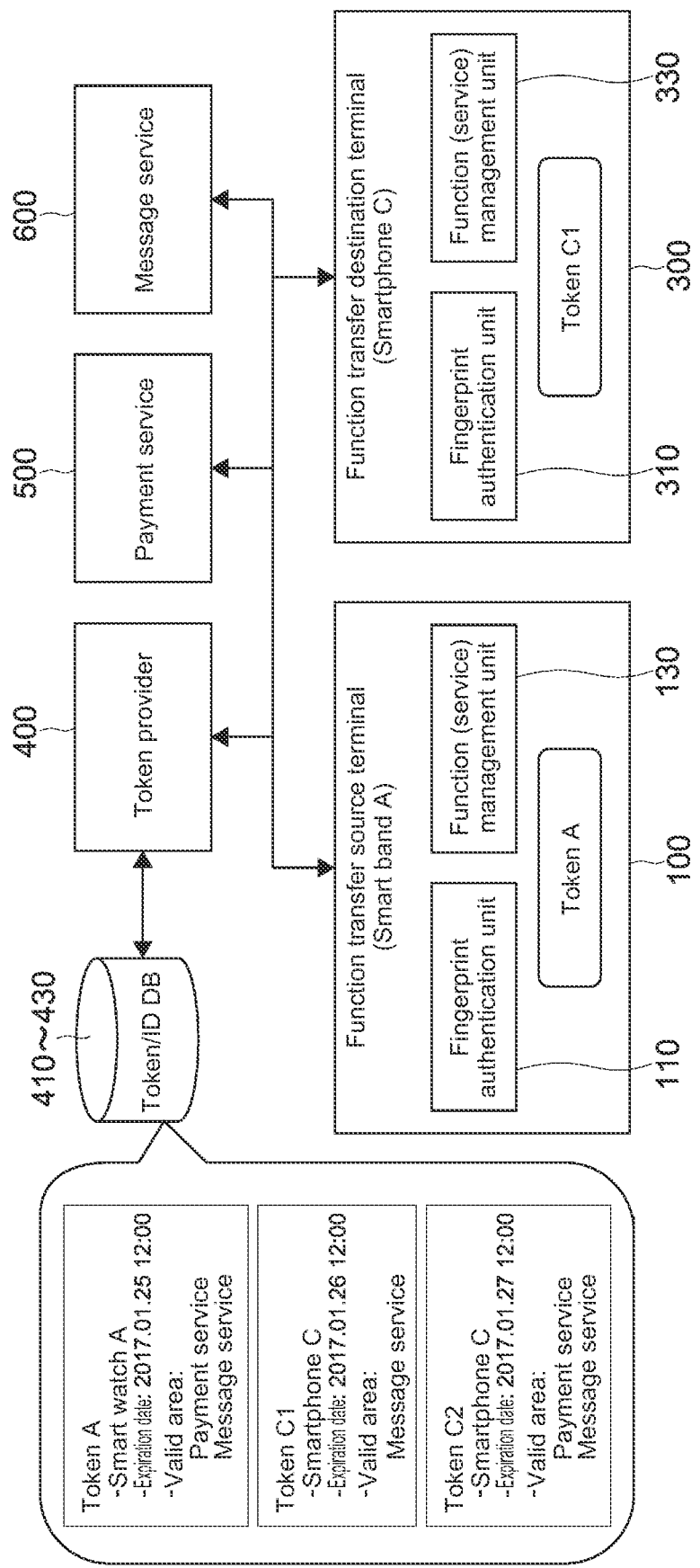
FIG. 6 is a diagram showing a configuration of a function transfer system according to a third embodiment of the present technology.

FIG. 6 is a diagram showing a configuration of a function transfer system according to this embodiment.

In the first and second embodiments described above, the example in which the use authority of one function of the transfer source terminal 100 is transferred has been described. In this embodiment, an example will be described in which the use authority of a plurality of functions of the transfer source terminal 100 is transferred in a stepwise manner in accordance with the remaining battery level of the transfer source terminal 100.

As shown in FIG. 6, in this embodiment, the token provider 400 manages, in the token DB 410, a token A representing a set of the use authority of the payment service and the use authority of the message service as a token for the transfer source terminal 100 (smartwatch).

Meanwhile, the token provider 400 manages, in the token DB 410, a token C1 representing the use authority of the message service, and a token C2 representing a set of the usage authority of the payment service and the usage authority of the message service for the transfer destination terminal 200, as tokens for the transfer destination terminal 200 (smartphone).

The expiration dates of those tokens indicate that the message service has been transferred first, and then the payment service has been transferred, from the transfer source terminal 100 to the transfer destination terminal 200.

Figure 7:
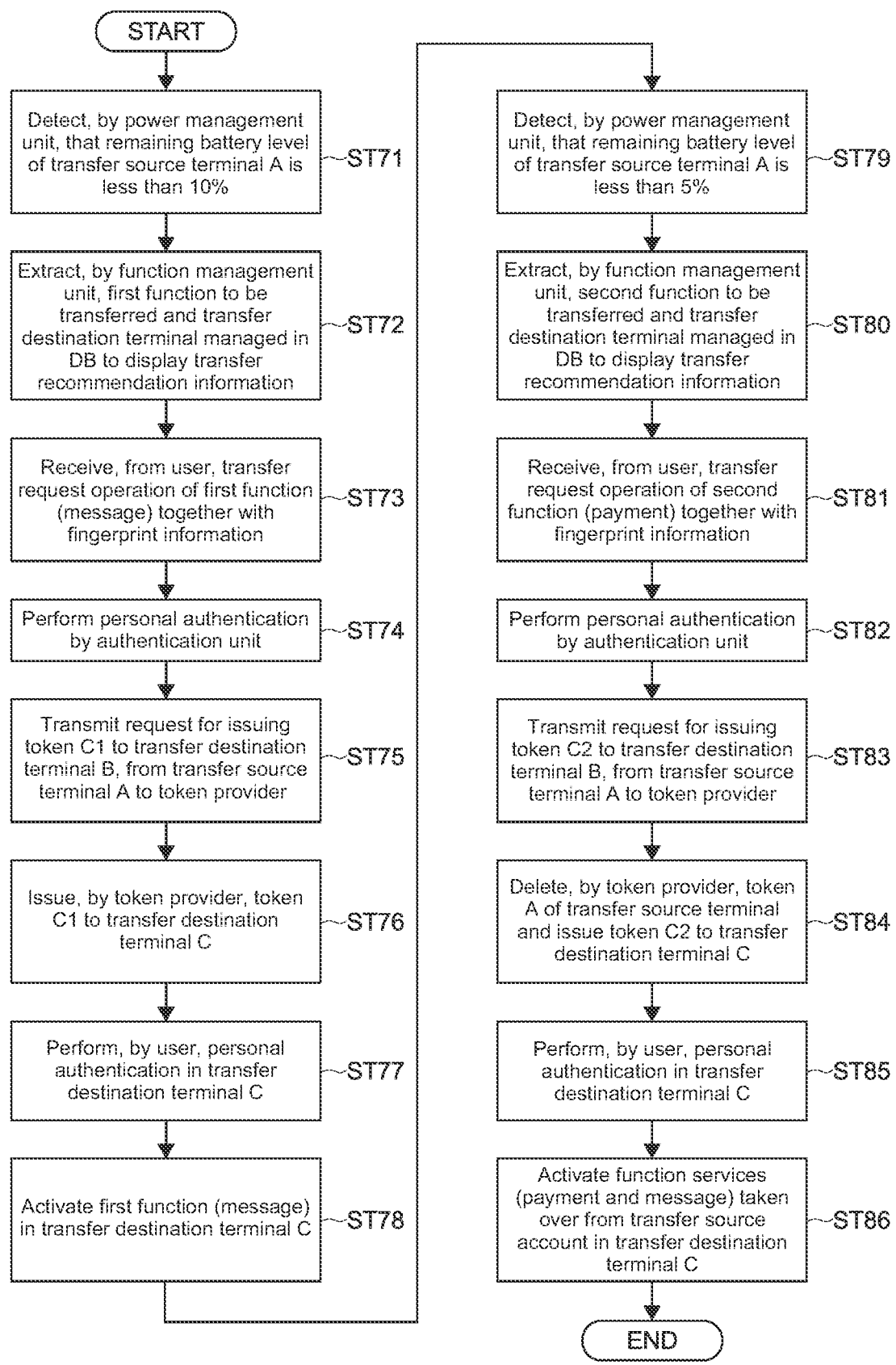
FIG. 7 is a flowchart showing the flow of the operation of the function transfer system according to the third embodiment of the present technology.
Figure 8:
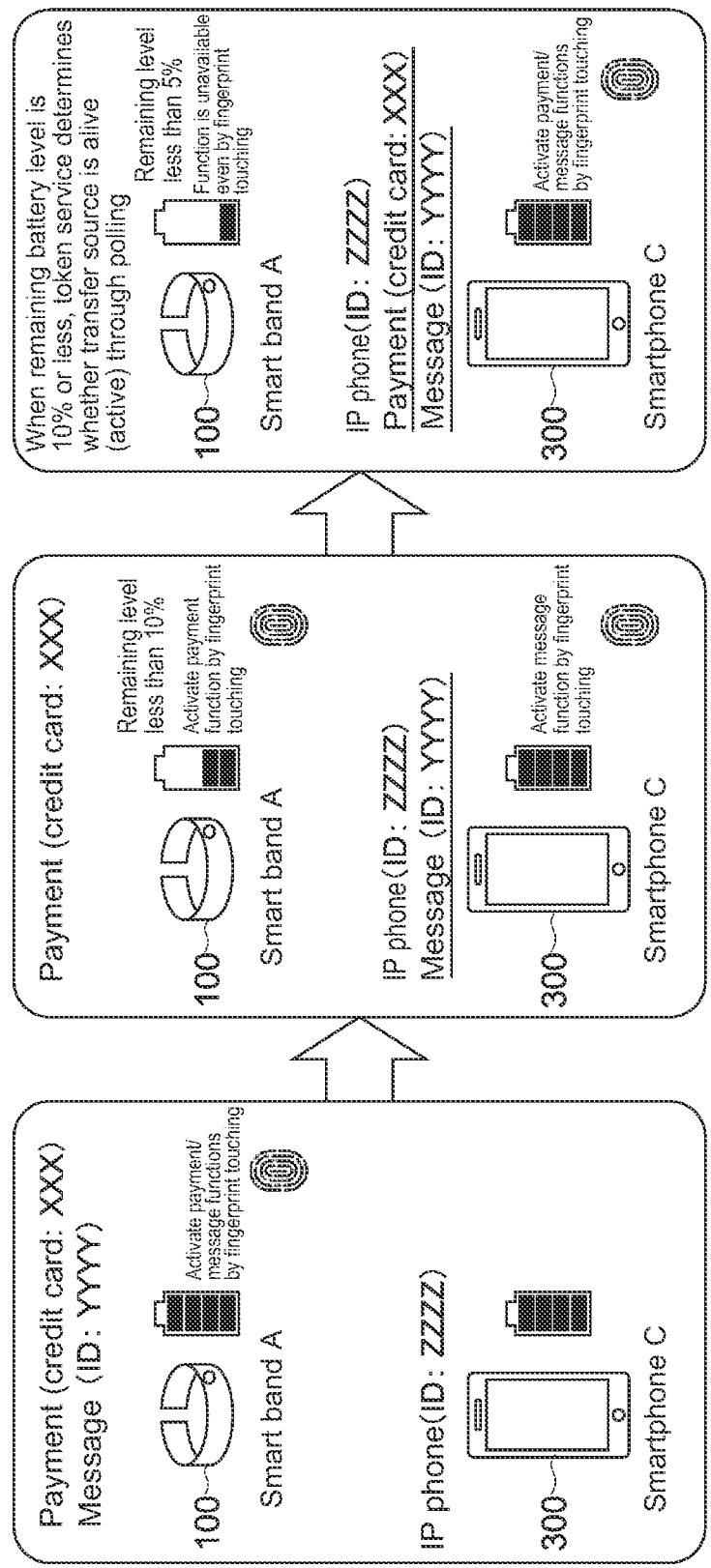
FIG. 8 is a diagram for describing stepwise function transfer processing in the function transfer system according to the third embodiment of the present technology.

FIG. 7 is a flowchart showing the flow of the operation of the function transfer system according to this embodiment. Further, FIG. 8 is a diagram for describing stepwise function transfer processing in the function transfer system.

As shown in FIG. 7, first, the CPU 11 (power management unit 160) of the transfer source terminal 100 detects that the remaining charge level of the battery 20 is less than a predetermined first threshold value (e.g., 10%) (Step 71).

The CPU 11 (function management unit 130) then selects a function (service) to be transferred among the functions (services) of the transfer source terminal 100 on the basis of previous setting, for example, acquires a list of transfer destination terminals managed in association with the transfer source terminal 100 from the terminal ID management DB 430, generates transfer recommendation information that recommends the transfer of the function, and causes the display unit 16 to display the transfer recommendation information (Step 72).

Subsequently, the CPU 11 (function management unit 130) receives, from the user, through the display unit 16, an operation for an agreement to transfer the displayed function and for a selection of the transfer destination terminal, that is, a transfer request operation, together with the fingerprint information of the user (Step 73). Here, it is assumed that the message service is selected by the CPU 11 as the function to be transferred, and the transfer destination terminal 200 is selected by the user as the transfer destination terminal.

Subsequently, the CPU 11 (authentication unit 110) executes the personal authentication processing on the basis of the input fingerprint information and the fingerprint pattern information stored in advance (Step 74).

If the user is authenticated by the authentication processing, the CPU 11 transmits a request signal for issuing the token C1 of the message service to the selected transfer destination terminal 200 (transfer request signal) to the token provider 400 by the communication unit 120 (Step 75).

The token provider 400 that has received the transfer request signal transmits the token C1 to the transfer destination terminal 200 (Step 76).

When receiving the token C1 from the token provider 400, the CPU (token management unit 240) of the transfer destination terminal 200 displays an authentication screen on the display unit to prompt the user to input, for example, a fingerprint pattern, and the authentication unit 210 authenticates that user on the basis of the input fingerprint pattern (Step 77).

If the authentication succeeds, the token management unit 240 sets the received token C1 to valid (Step 78). Thus, the messaging service is set to valid in the transfer destination terminal 200.

Further, when the remaining charge level of the battery 20 is less than 10%, the token provider 400 determines whether the transfer source terminal 100 is alive (active) through polling to the transfer source terminal 100.

The CPU 11 (power management unit 160) of the transfer source terminal 100 then detects that the remaining charge level of the battery 20 is less than a predetermined second threshold value (e.g., 5%) (Step 79).

In a similar way to the above, the CPU 11 (function management unit 130) then generates transfer recommendation information including the function to be transferred and the list of transfer destination terminals and causes the display unit 16 to display the transfer recommendation information (Step 80).

Subsequently, the CPU 11 (function management unit 130) receives the transfer request operation (and input of fingerprint information) from the user through the display unit 16 (Step 81). Here, it is assumed that the payment service is selected by the CPU 11 as the function to be transferred, and the transfer destination terminal 200 is selected by the user as the transfer destination terminal.

Subsequently, the CPU 11 (authentication unit 110) executes the personal authentication processing on the basis of the input fingerprint information and the fingerprint pattern information stored in advance (Step 82).

If the user is authenticated by the authentication processing, the CPU 11 transmits a request signal for issuing the token C2 of the payment service to the selected transfer destination terminal 200 (transfer request signal) to the token provider 400 by the communication unit 120 (Step 83).

The token provider 400 that has received the transfer request signal transmits the token C2 to the transfer destination terminal 200 (Step 84).

When the CPU (token management unit 240) of the transfer destination terminal 200 receives the token C2 from the token provider 400, the authentication unit 210 authenticates the user on the basis of the fingerprint pattern input on the authentication screen (Step 85).

If the authentication succeeds, the token management unit 240 sets the received token C2 to valid (Step 86). Thus, the payment service is set to valid in the transfer destination terminal 200, in addition to the message service. At that time, the token provider 400 deletes the token A from the token management unit 140 of the transfer source terminal 100.

Instead of allowing the user to select a function to be transferred, the CPU 11 may previously set a plurality of specific functions as functions to be transferred in a stepwise manner, for example, stepwise threshold values and functions regarding the remaining charge level of the battery 20 in association with each other.

In this case, the CPU 11 may set the functions so as to be transferred from a function having a lower importance (e.g., message service) for the user of the transfer source terminal 100 (transfer destination terminal 200) in consideration of security, or may set the functions so as to be transferred from a function having a higher importance (e.g., payment service) in consideration of redundancy.

As described above, according to this embodiment, the transfer source terminal 100 is capable of delegating a plurality of functions in a stepwise manner in accordance with the selection of the user, the importance, and the like.

Fourth Embodiment

Next, a fourth embodiment of the present technology will be described. In this embodiment, portions having functions and configurations similar to those of the above embodiments are denoted by the same reference numerals, and overlapping descriptions are omitted or simplified.

This embodiment is similar to the fourth embodiment in the stepwise processing. However, in the fourth embodiment, the plurality of functions is transferred in a stepwise manner at each stage, but in this embodiment, one function is transferred (activated) through the stepwise processing.

Figure 9:
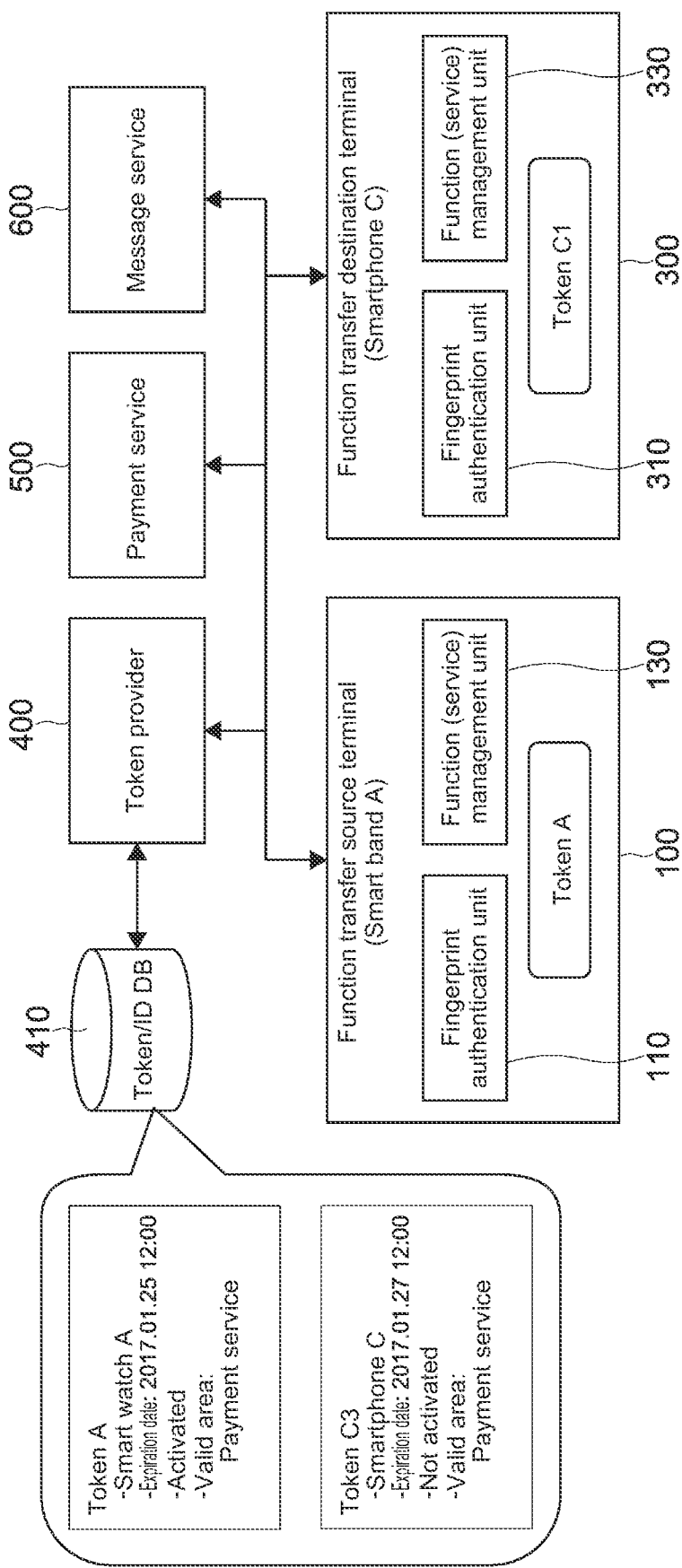
FIG. 9 is a diagram showing a configuration of a function transfer system according to a fourth embodiment of the present technology.

FIG. 9 is a diagram showing a configuration of a function transfer system according to this embodiment. As shown in the figure, in this embodiment, the token provider 400 manages, in the token DB 410, a token A representing the use authority of the payment service as a token for the transfer source terminal 100 (smartwatch). The token A has been activated in the transfer source terminal 100.

On the other hand, the token provider 400 manages, in the token DB 410, a token C3 representing the use authority of the payment service as a token for the transfer destination terminal 200. However, the token C3 has not yet been activated in the transfer destination terminal 200.

Figure 10:
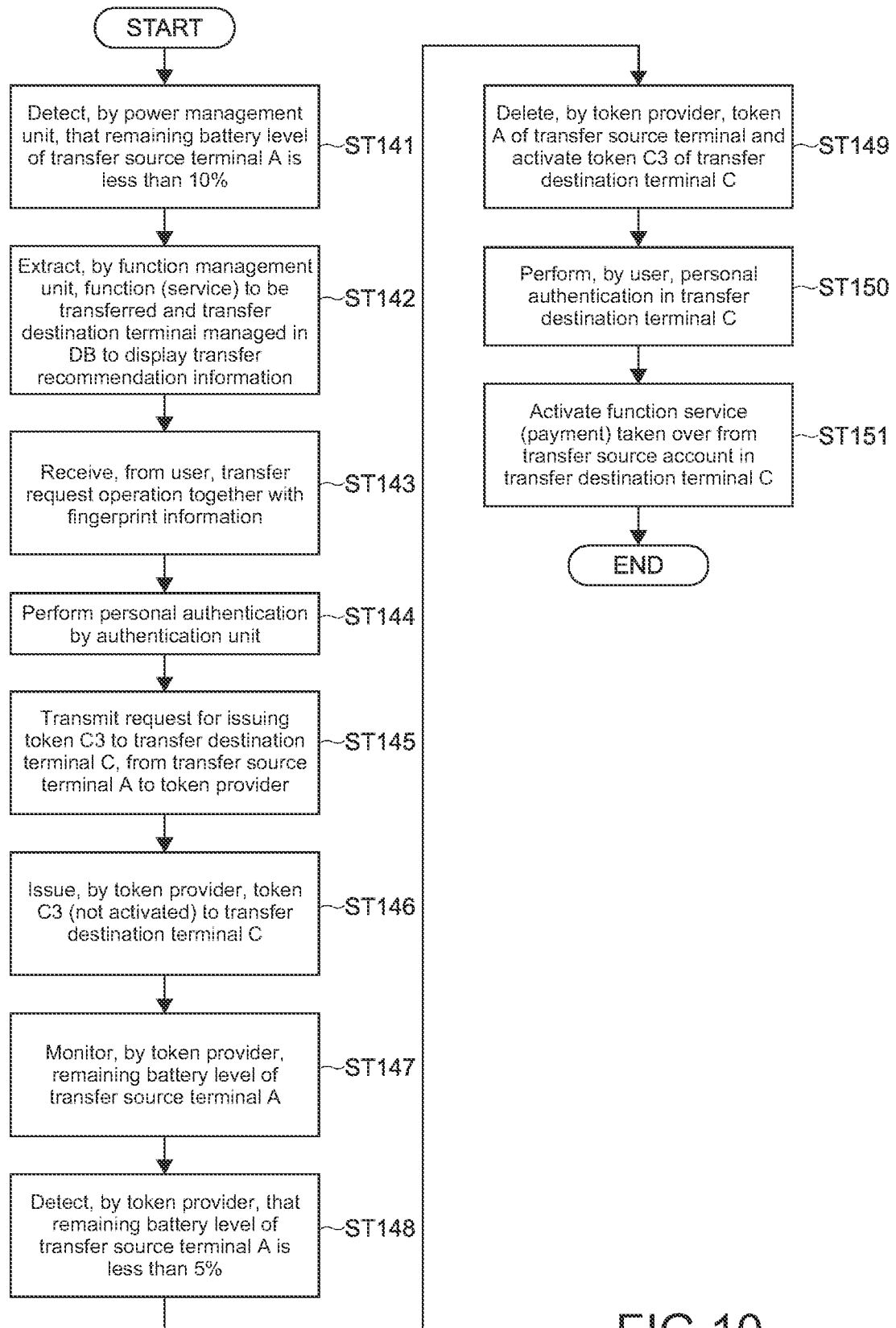
FIG. 10 is a flowchart showing the flow of the operation of the function transfer system according to a fourth embodiment of the present technology.
Figure 11:
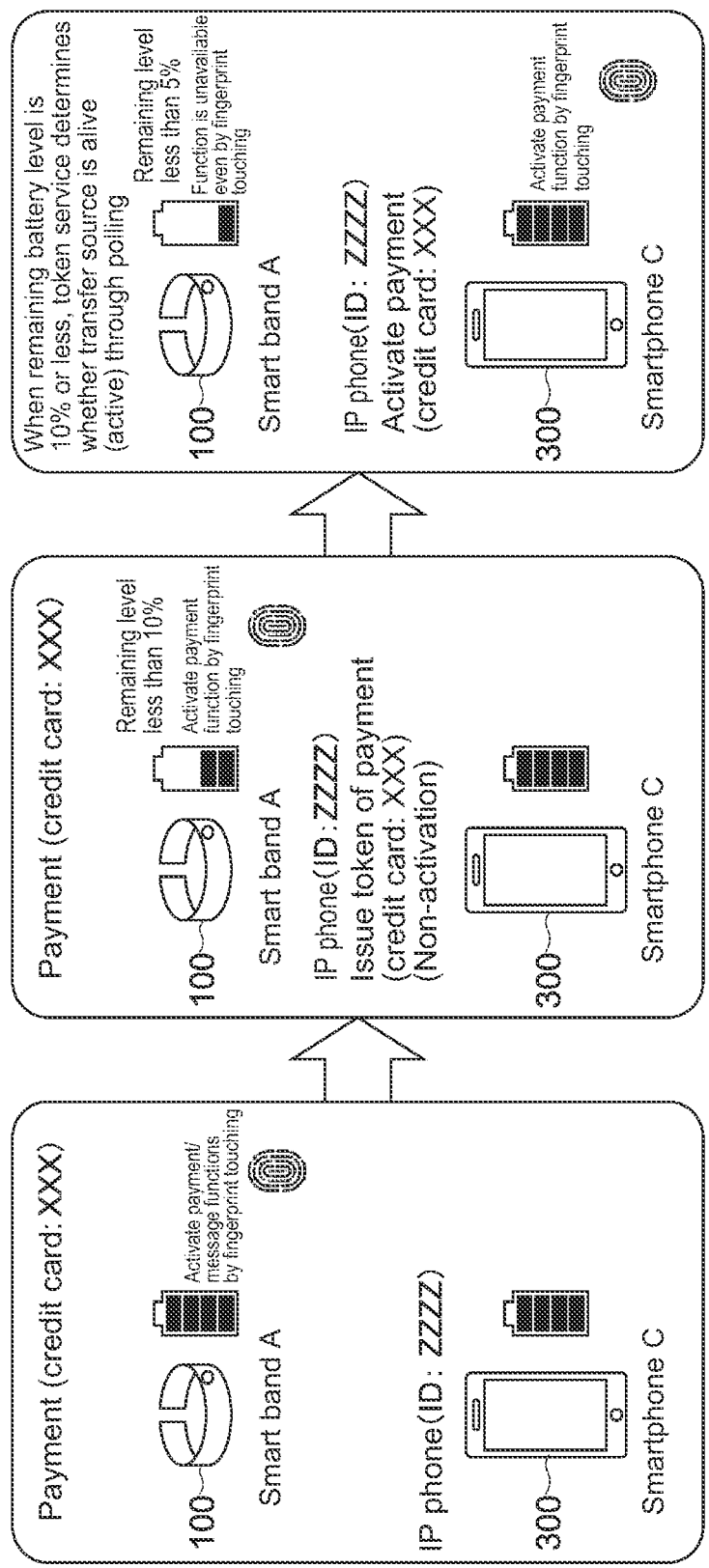
FIG. 11 is a diagram for describing activation processing for the stepwise function transfer in the function transfer system according to the fourth embodiment of the present technology.

FIG. 10 is a flowchart showing the flow of the operation of the function transfer system according to this embodiment. Further, FIG. 11 is a diagram for describing activation processing for the stepwise function transfer in the function transfer system according to this embodiment.

As shown in FIG. 10, first, the CPU 11 (power management unit 160) of the transfer source terminal 100 detects that the remaining charge level of the battery 20 is less than a predetermined first threshold value (e.g., 10%) (Step 141).

The CPU 11 (function management unit 130) then selects a function (service) to be transferred among the functions (services) of the transfer source terminal 100 on the basis of previous setting, for example, acquires a list of transfer destination terminals managed in association with the transfer source terminal 100 from the terminal ID management DB 430, generates transfer recommendation information that recommends the transfer of the function, and causes the display unit 16 to display the transfer recommendation information (Step 142).

Subsequently, the CPU 11 (function management unit 130) receives, from the user, through the display unit 16, an operation for an agreement to transfer the displayed function and for a selection of the transfer destination terminal, that is, a transfer request operation, together with the fingerprint information of the user (Step 143). Here, it is assumed that the payment service is selected by the CPU 11 as the function to be transferred, and the transfer destination terminal 200 is selected by the user as the transfer destination terminal.

Subsequently, the CPU 11 (authentication unit 110) executes the personal authentication processing on the basis of the input fingerprint information and the fingerprint pattern information stored in advance (Step 144).

If the user is authenticated by the authentication processing, the CPU 11 transmits a request signal for issuing the token C3 of the payment service to the selected transfer destination terminal 200 (transfer request signal) to the token provider 400 by the communication unit 120 (Step 145).

The token provider 400 that has received the transfer request signal transmits the token C3 to the transfer destination terminal 200 (Step 146). However, at that time, the token provider 400 transmits the token C3 that has not yet been activated, and maintains the corresponding token A in the transfer source terminal 200 in the activated state.

Further, from this point of time, the token provider 400 performs polling to the transfer source terminal 100 to monitor the remaining charge level of the battery 20 of the transfer source terminal 100 (Step 147). In response to the polling, the transfer source terminal 100 transmits remaining charge level information of the battery 20 to the token provider 400.

If the CPU 11 (power supply managing unit 160) of the transfer source terminal 100 detects that the remaining charge level of the battery 20 is less than a predetermined second threshold value (e.g., 5%), information indicating a fixed price of the remaining charge level is transmitted to the token provider 400 in response to the polling from the token provider 400. Thus, the token provider 400 detects that the remaining charge level of the battery 20 is equal to or less than the second threshold value (Step 148).

The token provider 400 then deletes (deactivates) the token A of the transfer source terminal 100 and activates the token C3 in the non-activated state of the transfer destination terminal C (Step 149).

Subsequently, in response to the activation processing performed by the token provider 400, the CPU (token management unit 240) of the transfer destination terminal 200 authenticates the user by the authentication unit 210 using the fingerprint pattern input on the authentication screen (Step 150).

If the authentication succeeds, the token management unit 240 sets the received token C3 to valid (Step 151). Thus, the payment service is set to valid in the transfer destination terminal 200.

As described above, according to this embodiment, the transfer source terminal 100 first causes the transfer destination terminal to hold the token when the remaining charge level of the battery 20 is lowered to some extent, and activates the token when the remaining charge level is further lowered and is likely to run out. This allows the transfer source terminal 100 to reliably perform the transfer while leaving the function in the transfer source terminal 100 as much as possible.

Fifth Embodiment

Next, a fifth embodiment of the present technology will be described. In this embodiment, portions having functions and configurations similar to those of the above embodiments are denoted by the same reference numerals, and overlapping descriptions are omitted or simplified.

Figure 12:
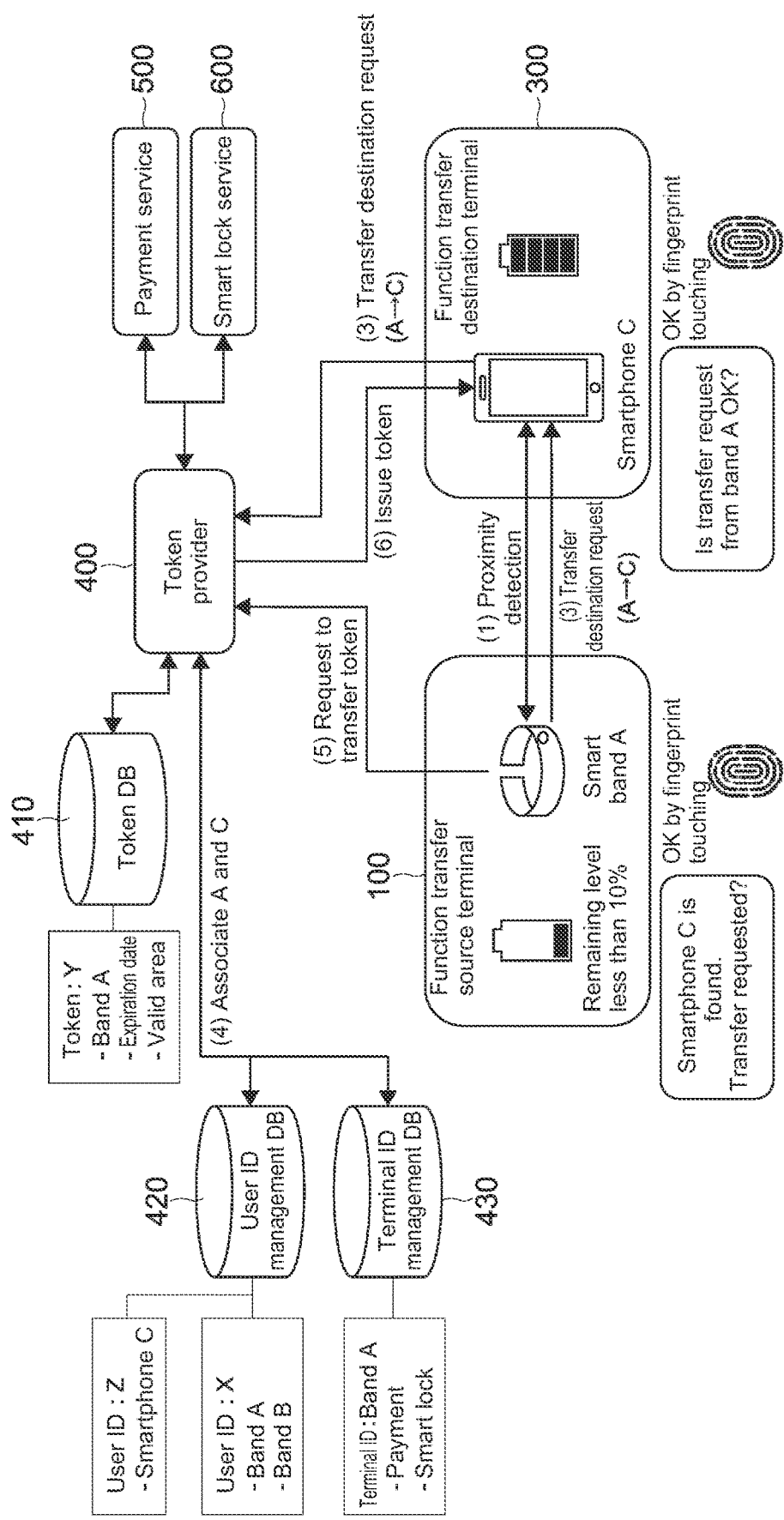
FIG. 12 is a diagram showing a configuration of a function transfer system according to a fifth embodiment of the present technology.
Figure 13:
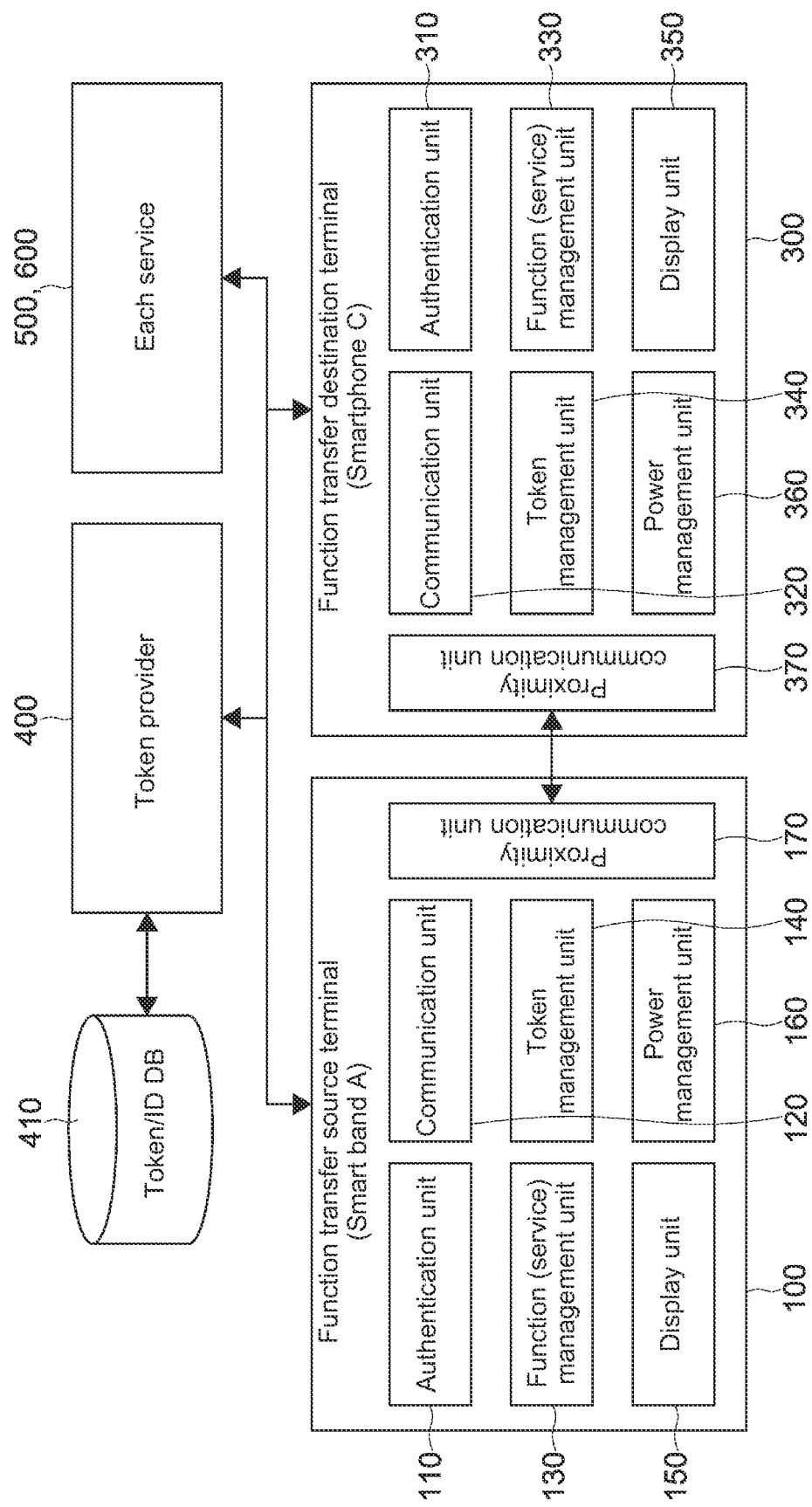
FIG. 13 is a diagram showing a functional block of the function transfer system according to the fifth embodiment of the present technology.

FIG. 12 is a diagram showing a configuration of a function transfer system according to this embodiment. Further, FIG. 13 is a diagram showing functional blocks of the function transfer system according to this embodiment.

In each embodiment described above, it is assumed that the transfer source terminal and the transfer destination terminal are owned by the same user. In this embodiment, a system capable of transferring functions even when a transfer source terminal and a transfer destination terminal are owned by different users is achieved.

As shown in FIG. 12, in this embodiment, the token provider 400 manages, in the user ID table 420, a user who has a user ID X and owns a smart band A and a smart band B, and another user who has a user ID Z and owns a smartphone C.

Both the users may be, for example, families or acquaintances, or one user may be a terminal rental agent and the other user may be a user who rents a terminal from the rental agent. The following case is assumed: when one user tries to execute a certain function in a terminal, the remaining charge level of the battery is likely to run out, and thus the function is transferred to a terminal of the other user (a terminal of a family member being together or a rented terminal) and then executed.

In this case, if the transfer destination terminal is a user's terminal, the user only needs to prepare tokens in a plurality of terminals in advance. However, in a case where the transfer destination terminal is a terminal in which no token is registered, other than the user's terminal, the user fails to register a token in advance in association with the user's terminal. In this regard, in this embodiment, the transfer processing is executed by using proximity communication between the transfer source terminal and the transfer destination terminal.

That is, as shown in FIG. 12, the transfer source terminal 100 transmits additional information necessary for the function transfer by using proximity communication with the transfer destination terminal 300, and requests the issuance of token information, which is related to the authority to execute the function, through a separate path (via the token provider 400).

As shown in FIG. 13, for the purpose of the proximity communication, in this embodiment, the transfer source terminal 100 includes a proximity communication unit 170, and the transfer destination terminal 300 includes a proximity communication unit 370, in addition to the configurations shown in FIG. 3.

Examples of communication means of the proximity communication unit include near field communication (NFC), ultrasonic waves, and infrared rays.

Next, the flow of the function transfer processing in this embodiment will be described.

As shown in FIG. 12, when the transfer source terminal 100 and the transfer destination terminal 300 come close to (or come into contact with) each other, both terminals are detected by the proximity communication units, and information (additional information such as a user ID, a terminal ID, and a password) regarding both terminals are exchanged ((1) in FIG. 12).

The CPU 11 of the transfer source terminal 100 then displays, on the display unit 150, a screen for confirming whether to transmit a function transfer destination registration request to the detected transfer destination terminal 300 by, for example, a touch operation using a fingertip (fingerprint).

If a touch operation is input on the screen and the fingerprint authentication succeeds, the CPU 11 transmits the transfer destination registration request to the transfer destination terminal 300 ((2) in FIG. 12).

The transfer destination terminal 300 that has received the transfer request displays, on the display unit 350, a screen for confirming whether to agree with the transfer destination registration request by, for example, a touch operation using a fingertip (fingerprint).

If a touch operation is input on the screen and the fingerprint authentication succeeds, the CPU of the transfer destination terminal 300 transmits the function transfer destination registration request, which has been transmitted from the transfer source terminal 100 to the transfer destination terminal 300, to the token provider 400 by the communication unit 320 ((3) in FIG. 12). The request includes a user ID and a terminal ID of each of the transfer source terminal 100 and the transfer destination terminal 300.

The token provider 400 that has received the transfer destination registration request registers the user ID and the terminal ID of the transfer destination terminal 300 in the user ID management DB 420 and the terminal ID management DB 430 in association with the transfer source terminal 100.

This completes the preprocessing of the function transfer. Subsequently, similarly to the embodiments described above, when the remaining charge level of the battery 20 is less than a threshold value, a token issuance request is transmitted to the token provider 400, and in response thereto, the token provider 400 issues a token to the transfer destination terminal 300.

As described above, according to this embodiment, the transfer source terminal 100 transmits the additional information to the transfer destination terminal by the proximity communication unit, thereby making it possible to transfer the use authority even if the additional information is not stored in the transfer destination terminal in advance (even if the transfer destination terminal is one owned by another person or a rented one).

Sixth Embodiment

Next, a sixth embodiment of the present technology will be described. In this embodiment, portions having functions and configurations similar to those of the above embodiments are denoted by the same reference numerals, and overlapping descriptions are omitted or simplified.

This embodiment is an embodiment in which the second embodiment and the fifth embodiment are combined, that is, an embodiment in which a function is transferred from a transfer source terminal to an unregistered transfer destination terminal (owned by another person or rented) having personal authentication means different from that of the transfer source terminal.

Figure 14:
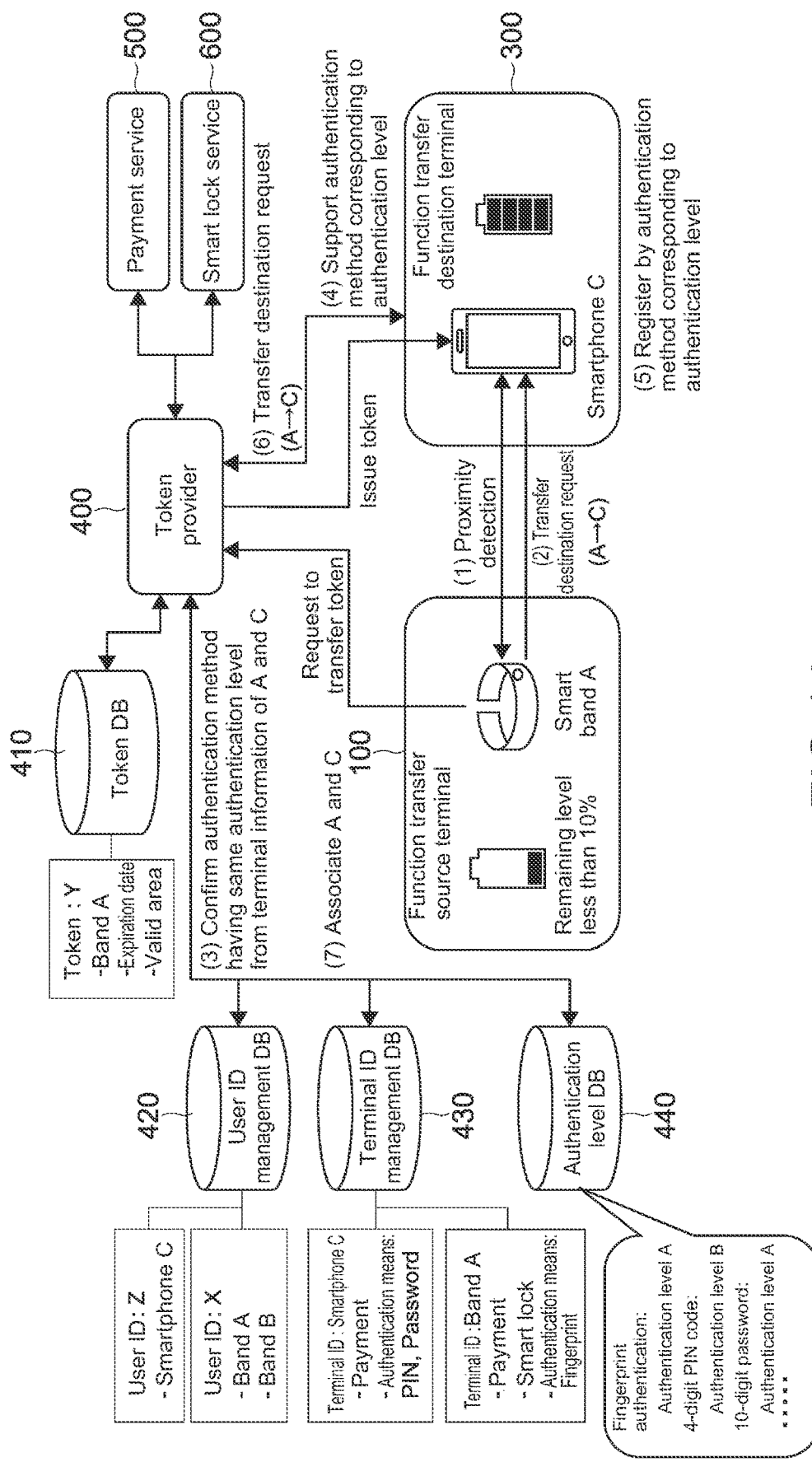
FIG. 14 is a diagram showing a configuration of a function transfer system according to a sixth embodiment of the present technology.
Figure 15:
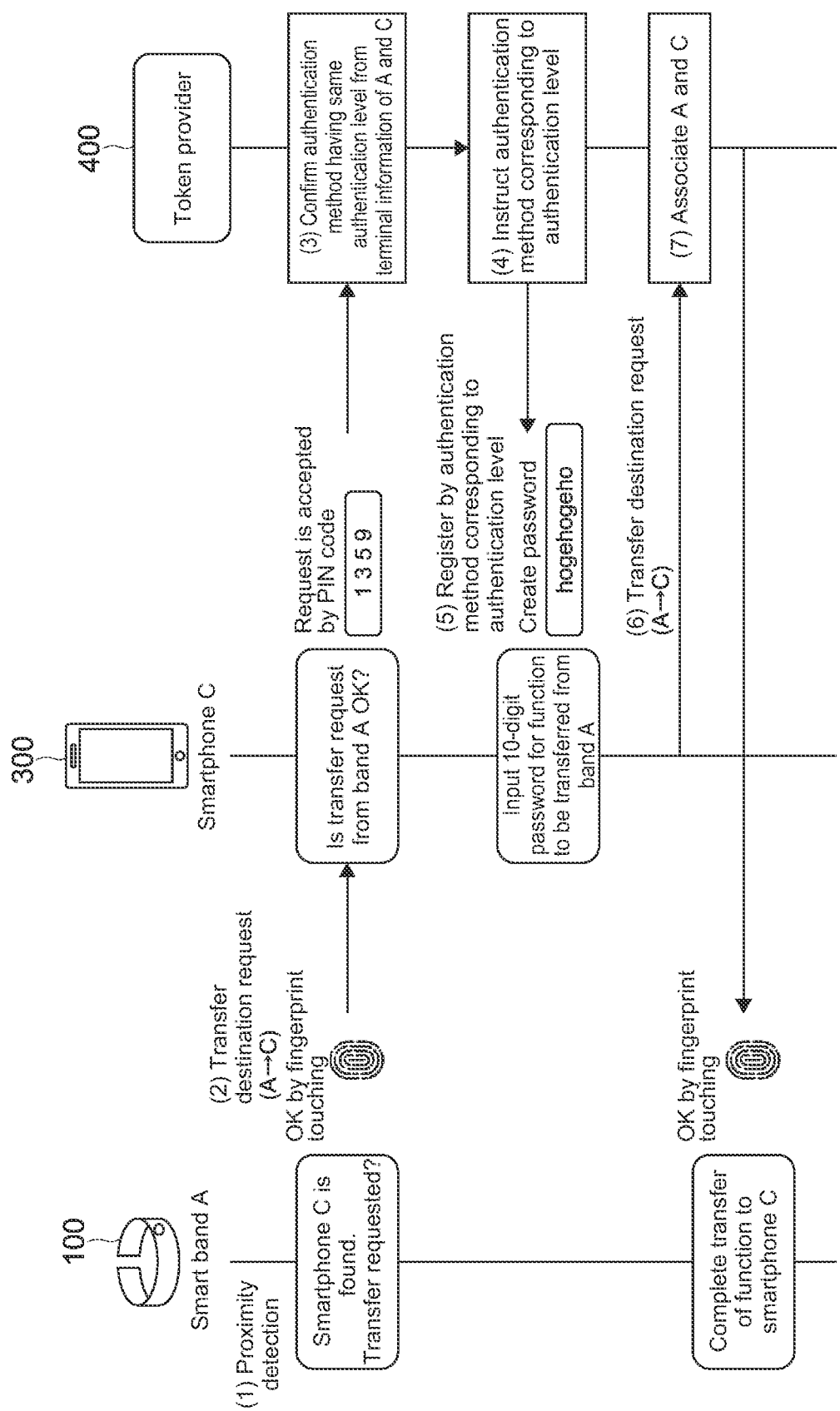
FIG. 15 is a flowchart showing the flow of the operation of the function transfer system according to the sixth embodiment of the present technology.

FIG. 14 is a diagram showing a configuration and an operation flow of a function transfer system according to this embodiment. Further, FIG. 15 is a flowchart showing the flow of the operation of the function transfer system according to this embodiment.

As shown in FIG. 14, the token provider 400 includes an authentication level DB 440 as in the second embodiment.

Further, the token provider 400 manages a plurality of user IDs in the user ID management DB 420 and also manages a plurality of terminal IDs in the terminal ID management DB 430 in association with respective pieces of authentication means information.

In this embodiment, it is assumed that the transfer source terminal 100 includes fingerprint authentication means serving as authentication means, and the transfer destination terminal 300 includes PIN-code and password input means serving as authentication means.

Next, the flow of the function transfer processing in this embodiment will be described.

As shown in FIGS. 14 and 15, first, when the transfer source terminal 100 and the transfer destination terminal 300 come close to (or come into contact with) each other, both terminals are detected by the proximity communication units, and information indicating both terminals are exchanged ((1) in FIGS. 14 and 15).

The CPU 11 of the transfer source terminal 100 then displays, on the display unit 150, a screen for confirming whether to transmit a function transfer destination registration request to the detected transfer destination terminal 300 by a touch operation using a fingerprint.

If a touch operation is input on the screen and the fingerprint authentication succeeds, the CPU 11 transmits a transfer destination registration request to the transfer destination terminal 300 ((2) in FIGS. 14 and 15).

The transfer destination terminal 300 that has received the transfer request displays, on the display unit 350, a screen for confirming whether to agree with the transfer destination registration request by a PIN-code input operation.

If a PIN code is input on the screen and the authentication succeeds, the CPU of the transfer destination terminal 300 transmits the function transfer destination registration request, which has been transmitted from the transfer source terminal 100 to the transfer destination terminal 300, to the token provider 400 by the communication unit 320. The request includes a user ID and a terminal ID of each of the transfer source terminal 100 and the transfer destination terminal 300.

The token provider 400 that has received the transfer destination registration request refers to the user ID management DB 420, the terminal ID management DB 430, and the authentication level DB 440, and determines an authentication method having the same authentication level in the authentication means that differs between the transfer source terminal 100 and the transfer destination terminal 300 ((3) in FIGS. 14 and 15).

Subsequently, the token provider 400 instructs the transfer destination terminal 300 to perform an authentication method (corresponding to the transfer source terminal 100) according to the authentication level determined above ((4) in FIGS. 14 and 15).

The CPU of the transfer destination terminal 300 instructed to perform the authentication method allows the user to register authentication information by the authentication method corresponding to the authentication level ((5) in FIGS. 14 and 15). Here, a 10-digit password, which corresponds to the authentication level of the fingerprint authentication of the transfer source terminal 100, is created and registered.

If the authentication succeeds by re-entering of the password, the CPU transmits a transfer destination registration request to the token provider 400 ((6) in FIGS. 14 and 15).

In response to the request, the token provider 400 registers the user ID and the terminal ID of the transfer destination terminal 300 in the user ID management DB 420 and the terminal ID management DB 430 in association with the transfer source terminal 100.

This completes the preprocessing of the function transfer. Subsequently, similarly to the embodiments described above, when the remaining charge level of the battery 20 is less than a threshold value, a token issuance request is transmitted from the transfer source terminal 100 to the token provider 400 through the fingerprint authentication, and in response thereto, the token provider 400 issues a token to the transfer destination terminal 300.

As described above, according to this embodiment, the transfer source terminal 100 is capable of transferring the use authority even if the transfer destination terminal is one owned by another person or a rented one and even if the transfer destination terminal includes authentication means different from that of the transfer source terminal 100.

Seventh Embodiment

Next, a seventh embodiment of the present technology will be described. In this embodiment, portions having functions and configurations similar to those of the above embodiments are denoted by the same reference numerals, and overlapping descriptions are omitted or simplified.

In this embodiment, the transfer source terminal 100 executes the function transfer processing in consideration of the communication radio wave intensity of the communication unit 120 as a trigger of the function transfer, in addition to the remaining charge level of the battery 20 in each embodiment described above.

That is, the CPU 11 of the transfer source terminal 100 monitors the radio wave intensity received by the communication unit 120 in addition to the remaining charge level of the battery 20, displays the transfer recommendation information when the remaining charge level of the battery 20 is less than the threshold value and when the radio wave intensity is less than a predetermined threshold value, and transmits a transfer request signal through the user operation and authentication processing.

The transfer processing in which the communication radio wave intensity is also taken into consideration may be used for the stepwise transfer processing for a plurality of functions as shown in the third embodiment or the stepwise activation processing for a function as shown in the fourth embodiment.

Figure 16:
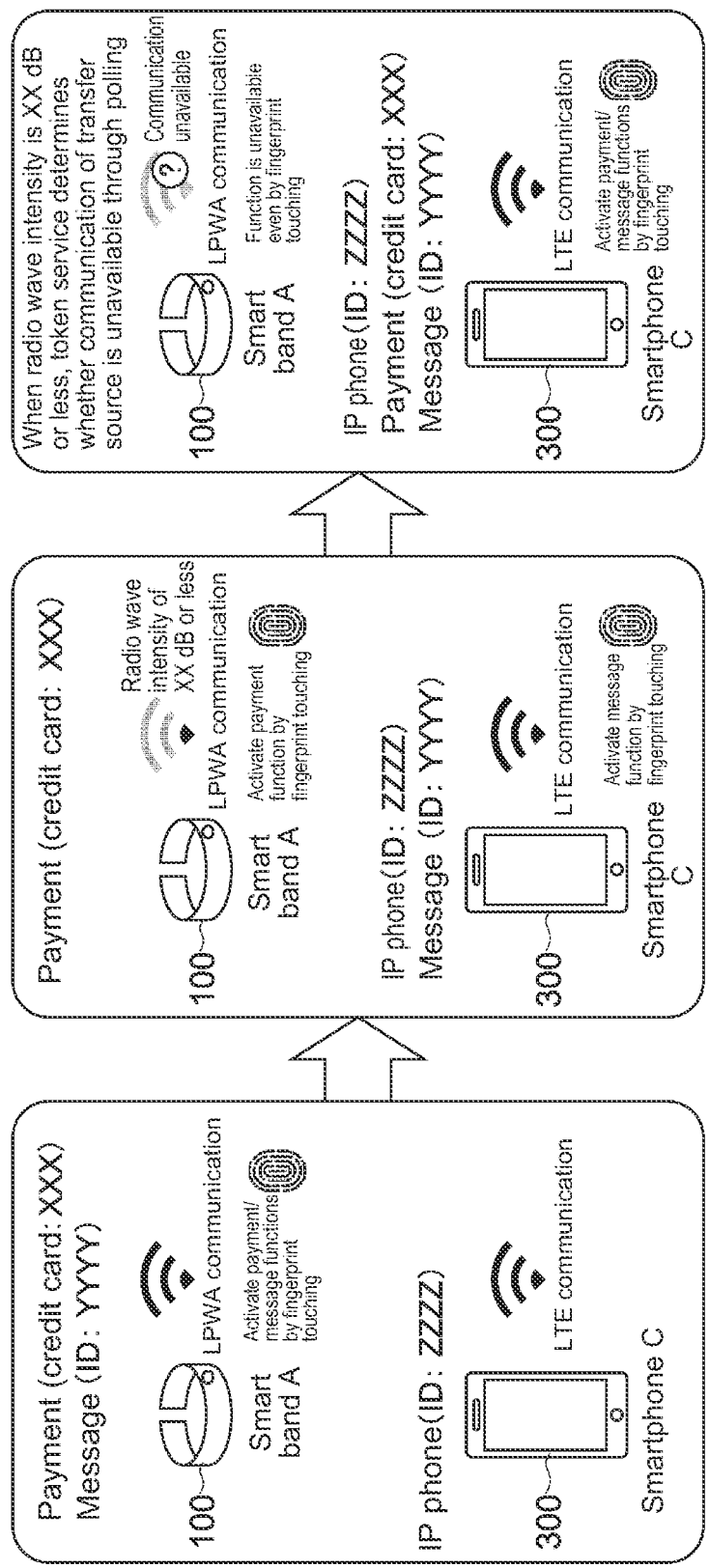
FIG. 16 is a diagram for describing stepwise function transfer processing in the function transfer system according to a seventh embodiment of the present technology.

That is, as shown in FIG. 16, the CPU 11 of the transfer source terminal 100 may transfer a first function (e.g., message service) to the transfer destination terminal 300 when the remaining charge level of the battery 20 is less than a first threshold value and when the radio wave intensity is less than a first threshold value, and may transfer a second function (e.g., payment service) to the transfer destination terminal 300 when the remaining charge level of the battery 20 is less than a second threshold value and when the radio wave intensity is less than a second threshold value.

Thus, the transfer source terminal 100 is capable of determining the function transfer in consideration of not only the remaining battery level but also the communication radio wave status.

MODIFIED EXAMPLES

The present technology is not limited to the embodiments described above but may be variously modified without departing from the gist of the present technology.

In each of the embodiments described above, the transfer source terminal 100 may transmit a recovery request signal requesting recovery of the use authority to the token provider 400 when detecting that the remaining charge level of the battery 20 has recovered to the threshold value or more after transferring the use authority of the function to the transfer destination terminal.

In this case, when detecting the recovery of the remaining charge level, the CPU 11 may display recovery recommendation information recommending the return of the function to the transfer source terminal 100 on the display unit 16 in a similar manner to the display of the above-mentioned transfer recommendation information, and may transmit the recovery request signal when receiving a user input.

Further, when receiving the above-mentioned recovery request signal, the token provider 400 transmits information indicating the above-mentioned request to the transfer destination terminal, and the transfer destination terminal displays a screen for confirming whether or not there is an agreement on recovery of the function to the transfer source terminal 100 (deletion of the token from the transfer destination terminal). The transfer destination terminal receives an input indicating an agreement from the user and, when the user authentication succeeds, transmits a signal requesting a token re-issuance to the transfer source terminal 100 to the token provider 400. In response to this, the token provider 400 re-issues a token corresponding to the request to the transfer source terminal 100, and the function can be used again in the transfer source terminal 100 through user authentication.

In each of the embodiments described above, the transfer recommendation information is output as display information to the display unit. However, the transfer recommendation information may be output as sound information. In this case, the CPU 11 may confirm a user's agreement on the basis of input of the user's voice. In this case, voiceprint information is used as the user authentication means, and the input of the voice indicating the agreement may also serve as the input of a voiceprint pattern.

In each of the embodiments described above, the smart band is exemplified as a wearable device. However, the present technology is similarly applicable to other wearable devices such as a smart watch, smart glasses, and a head-mounted display.

In each of the embodiments described above, the payment service and the smart lock service have been described as the functions (services) to be transferred, but the functions (services) are not limited thereto. For example, a home IoT (e.g., IP camera, various sensors, home appliance controller, etc.) cooperation service including the smart lock service may be transferred.

<Others>

The present technology may also take the following configurations.

(1) An information processing apparatus, including:
  a communication unit capable of communicating with a server;
  a battery; and
  a controller that
    is capable of executing processing regarding a predetermined function for which personal authentication is required at a time of use,
    detects a remaining charge level of the battery, and
    transmits, when the detected remaining charge level is less than a predetermined threshold value, a transfer request signal to the server, the transfer request signal requesting transfer of use authority of the function to another information processing apparatus.

(2) The information processing apparatus according to (1), further including
  an output unit, in which
  the controller
    outputs, from the output unit, information for recommending the transfer of the use authority to the other information processing apparatus when the remaining charge level is less than the threshold value, and
    receives a user operation for transmitting the transfer request signal via the output unit.

(3) The information processing apparatus according to (2), in which
  the controller requests, when receiving the user operation, an input of information of personal authentication required for use of the function.

(4) The information processing apparatus according to (1), in which
  the controller transmits information regarding means and a level of the personal authentication in response to a request from the server, and
  the server sets a level of personal authentication in the other information processing apparatus to a level corresponding to the level of the personal authentication in the information processing apparatus if the means for the personal authentication differs between the information processing apparatus and the other information processing apparatus.

(5) The information processing apparatus according to (1), further including
  a short-range communication unit capable of short-range communication with the other information processing apparatus, in which
  the controller transmits additional information necessary for the transfer of the use authority to the other information processing apparatus by the short-range communication unit, and
  when the server receives the transfer request signal via the communication unit, the server deletes a first token indicating the use authority of the information processing apparatus and transmits a second token indicating the usage authority of the other information processing apparatus to the other information processing apparatus via a network.

(6) The information processing apparatus according to (5), in which
  the controller transmits authentication information necessary for personal authentication in the other information processing apparatus by the short-range communication unit if means for the personal authentication differs between the information processing apparatus and the other information processing apparatus.

(7) The information processing apparatus according to (1), in which
  the controller
    transmits, to the server, a first transfer request signal requesting transfer of use authority of a first function among a plurality of the functions when the detected remaining charge level is less than a first threshold value, and
    transmits, to the server, a second transfer request signal requesting transfer of use authority of a second function among the plurality of the functions when the detected remaining charge level is less than a second threshold value lower than the first threshold value.

(8) The information processing apparatus according to (1), in which
  the controller
    transmits, when the detected remaining charge level is less than a first threshold value, the transfer request signal to the server, and
    transmits, when the detected remaining charge level is less than a second threshold value lower than the first threshold value, remaining level lowering information to the server, the remaining level lowering information indicating that the remaining charge level is lowered, and the server transmits, when receiving the transfer request signal, a second token that is not activated and indicates the use authority of the other information processing apparatus to the other information processing apparatus in a state where the first token indicating the use authority of the information processing apparatus is activated, and deactivates the first token and activates the second token when receiving the remaining level lowering information.

(9) The information processing apparatus according to (1), in which the controller transmits a recovery request signal requesting recovery of the use authority to the server, when the detected remaining charge level becomes equal to or larger than the threshold value after being less than the threshold value.

(10) The information processing apparatus according to (1), in which the controller detects a radio wave intensity received by the communication unit, and transmits the transfer request signal when the detected remaining charge level is less than the threshold value and when the detected radio wave intensity is less than a predetermined threshold value.

(11) An information processing method, including:

detecting a remaining charge level of a battery of an information processing apparatus capable of executing processing regarding a predetermined function for which personal authentication is required at a time of use; and transmitting, when the detected remaining charge level is less than a predetermined threshold value, a transfer request signal to a server, the transfer request signal requesting transfer of use authority of the function from the information processing apparatus to another information processing apparatus.

(12) A program that causes an information processing apparatus, which is capable of executing processing regarding a predetermined function for which personal authentication is required at a time of use, to execute the steps of:

detecting a remaining charge level of a battery of the information processing apparatus; and transmitting, when the detected remaining charge level is less than a predetermined threshold value, a transfer request signal to a server, the transfer request signal requesting transfer of use authority of the function from the information processing apparatus to another information processing apparatus.

REFERENCE SIGNS LIST

11 CPU
16 display unit
17 operation receiving unit
19 communication unit
20 battery
110 authentication unit
130 function management unit
140 token management unit
160 power management unit
100 transfer source terminal
200 transfer destination terminal
400 token provider
410 token DB
420 user ID management DB
430 terminal ID management DB

The invention claimed is:

1. A first information processing apparatus, comprising:
a communication unit configured to communicate with a server;
a battery;
a short-range communication unit configured for short-range communication with a second information processing apparatus; and
a controller configured to:
execute a process regarding a first function for which personal authentication is required at a time of use;
detect a remaining charge level of the battery;
transmit, based on the detected remaining charge level is less than a first threshold value, a first transfer request signal to the server, wherein the first transfer request signal requests transfer of use authority of the first function to the second information processing apparatus; and
transmit additional information necessary for the transfer of the use authority to the second information processing apparatus by the short-range communication unit, wherein
based on reception of the first transfer request signal by the server, the server deletes a first token indicating the use authority of the first information processing apparatus and transmits a second token to the second information processing apparatus via a network, and
the second token indicates the use authority of the second information processing apparatus.

2. The information processing apparatus according to claim 1, further comprising an output unit, wherein the controller is further configured to:
output, from the output unit, information to recommend the transfer of the use authority to the second information processing apparatus based on the remaining charge level is less than the first threshold value, and
receive a user operation to transmit the first transfer request signal via the output unit.

3. The information processing apparatus according to claim 2, wherein
the controller is further configured to request, based on the received user operation, an input of information of personal authentication required for use of the first function.

4. The information processing apparatus according to claim 1, wherein
the controller is further configured to transmit information regarding means and a level of personal authentication in response to a request from the server, and
the server sets a level of personal authentication in the second information processing apparatus to a level corresponding to the level of the personal authentication in the first information processing apparatus based on the means for the personal authentication differs between the first information processing apparatus and the second information processing apparatus.

5. The information processing apparatus according to claim 1, wherein
the controller is further configured to transmit authentication information necessary for personal authentication in the second information processing apparatus by the short-range communication unit based on means for the personal authentication differs between the first information processing apparatus and the second information processing apparatus.

6. The information processing apparatus according to claim 1, wherein the controller is further configured to:
transmit, to the server, the first transfer request signal requesting transfer of the use authority of the first function among a plurality of functions based on the detected remaining charge level is less than the first threshold value; and
transmit, to the server, a second transfer request signal requesting transfer of use authority of a second function among the plurality of the functions when the detected remaining charge level is less than a second threshold value lower than the first threshold value.

7. The information processing apparatus according to claim 1, wherein
the controller is further configured to:
transmit, based on the detected remaining charge level is less than the first threshold value, the first transfer request signal to the server; and
transmit, based on the detected remaining charge level is less than a second threshold value lower than the first threshold value, remaining level lowering information to the server,
the remaining level lowering information indicates that the remaining charge level is lowered, and
the server
transmits, based on reception of the first transfer request signal, a second token that is not activated and indicates the use authority of the second information processing apparatus to the first information processing apparatus in a state where the first token indicating the use authority of the first information processing apparatus is activated, and
deactivates the first token and activates the second token based on the reception of the remaining level lowering information.

8. The information processing apparatus according to claim 1, wherein
the controller is further configured to transmit a recovery request signal requesting recovery of the use authority to the server, based on the detected remaining charge level becomes equal to or larger than the first threshold value after being less than the first threshold value.

9. The information processing apparatus according to claim 1, wherein the controller is further configured to:
detect a radio wave intensity received by the communication unit, and
transmit the first transfer request signal based on the detected remaining charge level is less than the first threshold value and the detected radio wave intensity is less than a second threshold value.

10. An information processing method, comprising:
detecting a remaining charge level of a battery of a first information processing apparatus capable of executing processing regarding a function for which personal authentication is required at a time of use;
performing communication between the first information processing apparatus and a second information processing apparatus;
transmitting, based on the detected remaining charge level is less than first threshold value, a transfer request signal to a server, the transfer request signal requesting transfer of use authority of the function from the first information processing apparatus to the second information processing apparatus; and
transmitting additional information necessary for the transfer of the use authority to the second information processing apparatus by a short-range communication unit, wherein
based on reception of the transfer request signal by the server, the server deletes a first token indicating the use authority of the first information processing apparatus and transmits a second token to the second information processing apparatus via a network, and
the second token indicates the use authority of the second information processing apparatus.

11. A non-transitory computer-readable medium having stored thereon computer-executable instructions that, when executed by a processor of a first information processing apparatus capable of executing processing regarding a function for which personal authentication is required at a time of use, cause the processor to execute operations, the operations comprising:
detecting a remaining charge level of a battery of the first information processing apparatus;
performing communication between the first information processing apparatus and a second information processing apparatus;
transmitting, based on the detected remaining charge level is less than a first threshold value, a transfer request signal to a server, the transfer request signal requesting transfer of use authority of the function from the first information processing apparatus to the second information processing apparatus; and
transmitting additional information necessary for the transfer of the use authority to the second information processing apparatus by a short-range communication unit, wherein
based on reception of the transfer request signal by the server, the server deletes a first token indicating the use authority of the first information processing apparatus and transmits a second token to the second information processing apparatus via a network, and
the second token indicates the use authority of the second information processing apparatus.

* * * * *